(12) United States Patent
Tennison et al.

(10) Patent No.: US 7,842,736 B2
(45) Date of Patent: Nov. 30, 2010

(54) POROUS CARBONS

(75) Inventors: Stephen Robert Tennison, Addelstone (GB); Oleksundr Prokopovych Kozynchenko, Basingtoke (GB); Volodymyr Vasyljovych Strelko, Kiev (UA); Andrew John Blackburn, Winchester (GB)

(73) Assignee: British American Tobacco (Investments) Limited, London (GB)

( * ) Notice: Subject to any disclaimer, the term of this patent is extended or adjusted under 35 U.S.C. 154(b) by 762 days.

(21) Appl. No.: 11/786,072

(22) Filed: Apr. 10, 2007

(65) Prior Publication Data

US 2010/0029795 A1 Feb. 4, 2010

Related U.S. Application Data

(62) Division of application No. 10/344,248, filed as application No. PCT/GB01/03560 on Aug. 7, 2001, now abandoned.

(30) Foreign Application Priority Data

Aug. 9, 2000 (GB) .................................. 00019417

(51) Int. Cl.
C08G 8/04 (2006.01)
C08J 9/12 (2006.01)
C01B 31/02 (2006.01)

(52) U.S. Cl. ........................ 521/187; 521/181; 521/189; 264/29.1; 264/129; 264/126

(58) Field of Classification Search ................. 521/187, 521/181, 99; 264/129, 177, 29.1, 12, 29.16; 243/455 R
See application file for complete search history.

(56) References Cited

U.S. PATENT DOCUMENTS

| | | | |
|---|---|---|---|
| 1,505,517 A | 8/1924 | Woodruff et al. |
| 1,758,202 A | 5/1930 | Whitman |
| 2,286,654 A | 6/1942 | Simpson et al. |
| 3,347,247 A | 10/1967 | Lloyd |
| 3,351,071 A | 11/1967 | Belfort |
| 3,368,566 A | 2/1968 | Avedikian |
| 3,409,020 A | 11/1968 | Westbrook |
| 3,557,801 A | 1/1971 | Jamison |
| 3,901,823 A | 8/1975 | Dimitri et al. |
| 3,909,449 A | 9/1975 | Nagai et al. |
| 4,015,610 A | 4/1977 | Pasche |
| 4,029,600 A | 6/1977 | Schmitt et al. |
| 4,040,990 A | 8/1977 | Neely |
| 4,045,368 A | 8/1977 | Katori et al. |
| 4,265,768 A | 5/1981 | Beasley et al. |
| 4,281,671 A | 8/1981 | Bynre et al. |
| 4,343,320 A | 8/1982 | Muto |
| 4,424,318 A | 1/1984 | Vairetti et al. |
| 4,439,349 A | 3/1984 | Everett et al. |
| 4,917,835 A | 4/1990 | Lear et al. |
| 4,957,897 A | 9/1990 | Maroldo et al. |
| 4,997,804 A | 3/1991 | Pekala et al. |
| 5,129,408 A | 7/1992 | Jakob et al. |
| 5,212,131 A | 5/1993 | Belding |
| 5,456,868 A | 10/1995 | Lear et al. |
| 5,896,961 A | 4/1999 | Aida et al. |
| 6,024,899 A | 2/2000 | Peng et al. |
| 6,033,506 A | 3/2000 | Klett |
| 6,048,908 A | 4/2000 | Kitagawa |
| 6,119,701 A | 9/2000 | Cerami et al. |
| 6,257,242 B1 | 7/2001 | Stavridis |
| 6,316,378 B1 | 11/2001 | Giebelhausen et al. |
| 6,328,443 B1 * | 12/2001 | Missell et al. ............... 347/106 |
| 6,492,471 B1 | 12/2002 | Eisenbeiss et al. |
| 6,615,842 B1 | 9/2003 | Cerami et al. |
| 6,737,445 B2 | 5/2004 | Bell et al. |
| 6,814,786 B1 | 11/2004 | Zhuang et al. |
| 6,865,068 B1 | 3/2005 | Murakami et al. |

(Continued)

FOREIGN PATENT DOCUMENTS

| | | | |
|---|---|---|---|
| CA | 2 472 757 | | 7/2003 |
| CN | 1247212 | * | 3/2000 |
| EP | 0 042 192 | | 12/1981 |
| EP | 0 051 210 | | 5/1982 |
| EP | 0 245 551 | | 11/1987 |

(Continued)

OTHER PUBLICATIONS

Ambersorb Carbonaceous Adsorbents, Technical Notes, 1992, Roham and Haas.

(Continued)

Primary Examiner—Irina S Zemel
(74) Attorney, Agent, or Firm—Kenyon & Kenyon LLP

(57) ABSTRACT

A method is provided for making mesoporous resin. It comprises:
(a) providing a nucleophilic component which comprises a phenolic compound or a phenol condensation prepolymer optionally with one or more modifying reagents selected from hydroquinone, resorcinol, urea, aromatic amines and heteroaromatic amines;
(b) dissolving the nucleophilic component in a pore former selected from the group consisting of a diol, a diol ether, a cyclic ester, a substituted cyclic ester, a substituted linear amide, a substituted cyclic amide, an amino alcohol and a mixture of any of the above with water, together with at least one electrophilic cross-linking agent selected from the group consisting of formaldehyde, paraformaldehyde, furfural and hexamethylene tetramine; and
(c) condensing the nucleophilic component and the electrophilic cross-linking agent in the presence of the pore former to form a porous resin. The resin may be formed in situ by pouring the partially cross-linked resin into hot oil. Mesoporous resin beads are obtained which can be carbonized into mesoporous carbon beads.

19 Claims, 15 Drawing Sheets

U.S. PATENT DOCUMENTS

| | | |
|---|---|---|
| 2003/0154993 A1 | 8/2003 | Paine et al. |
| 2003/0159703 A1 | 8/2003 | Yang et al. |
| 2003/0200973 A1 | 10/2003 | Xue et al. |
| 2003/0207635 A1 | 11/2003 | Minemura et al. |
| 2004/0016436 A1 | 1/2004 | Thomas |
| 2004/0024074 A1 | 2/2004 | Tennison et al. |
| 2004/0129280 A1 | 7/2004 | Woodson et al. |
| 2004/0194792 A1 | 10/2004 | Zhuang et al. |
| 2004/0226569 A1 | 11/2004 | Yang et al. |
| 2006/0180164 A1 | 8/2006 | Paine et al. |
| 2006/0201524 A1 | 9/2006 | Zhang et al. |
| 2007/0000507 A1 | 1/2007 | Xue et al. |
| 2007/0000508 A1 | 1/2007 | Xue et al. |

FOREIGN PATENT DOCUMENTS

| | | |
|---|---|---|
| EP | 0 628 260 | 12/1994 |
| EP | 1049116 | * 11/2000 |
| EP | 1 134 023 | 9/2001 |
| EP | 1 177 243 | 2/2002 |
| EP | 1 238 594 | 9/2002 |
| EP | 1 474 008 | 11/2004 |
| FR | 2 434 827 | 3/1980 |
| GB | 228 954 | 2/1925 |
| GB | 1 383 085 | 2/1975 |
| GB | 1 479 048 | 7/1977 |
| GB | 2 014 973 | 9/1979 |
| GB | 2 061 902 | 5/1981 |
| GB | 2 280 898 | 2/1995 |
| JP | 58-213613 | 12/1983 |
| JP | 60-027375 | 2/1985 |
| JP | 61-068135 | 4/1986 |
| JP | 63-237770 | 10/1988 |
| JP | 63-237771 | 10/1988 |
| JP | 63-237772 | 10/1988 |
| JP | 63-248380 | 10/1988 |
| JP | 03-091795 | 4/1991 |
| JP | 06-105675 | 4/1994 |
| RU | 2015996 | 7/1994 |
| WO | WO 91 09891 | 7/1991 |
| WO | WO 99 00187 | 1/1999 |
| WO | WO 00 05172 | 2/2000 |
| WO | WO 00 68300 | 11/2000 |
| WO | WO 01 19904 | 3/2001 |
| WO | WO 02 12380 | 2/2002 |
| WO | WO 02 069745 | 9/2002 |
| WO | WO 03 008068 | 1/2003 |
| WO | WO 03 020639 | 3/2003 |
| WO | WO 03 028495 | 4/2003 |
| WO | WO 03 059096 | 7/2003 |
| WO | WO 2004 046033 | 3/2004 |
| WO | WO 2005 016819 | 2/2005 |
| WO | WO 2005 032287 | 4/2005 |
| WO | WO 2005 115182 | 12/2005 |
| WO | WO 2006 064371 | 6/2006 |
| WO | WO 2006 103404 | 10/2006 |
| WO | WO 2007 069094 | 6/2007 |

OTHER PUBLICATIONS

"Flavour your cigarettes not your machines", Filtrona, Tobacco Reporter magazine, Feb. 1999, p. 9.

"What's Happening to Charcoal Filters?", Tobacco Reporter magazine, Mar. 1968, p. 24-31.

Adams, B.A., et al., "Aborptive Properties of Synthetic Resins," *J. Soc. Chem. Ind.*, (54): 1-6T, Jan. 1935.

Bansal, R.C., et al., "Active Carbon", 1991, p. 1-26.

Bratek, K. et al. "Carbon adsorbents from waste ion-exchange resin" Carbon, Feb. 2002, 40(12): 2213-2220.

Cristal, M.J., "Applications of Ion-Exchange in the Food Industry," *Chem and Ind.*, (21): 814-817, Nov. 1983.

Hassler, J.W., "Activate Carbon", 1951, p. 89-94.

Jankowska, H., et al., "Active Carbon", 1991, p. 13-104.

Liptrot, G.F., et al., "Modern Physical Chemistry", 4th Edition, 1986, pp. 154-168.

Quirke, N., et al., "The Interpretation of Pore Size Distributions of Microporous Carbons", Carbon, 1996, 34(10): 1281-1286.

Raker, M., et al., "Carbon Action", Tobacco Reporter magazine, Sep. 1996, p. 38-42.

Tennison, S.R., "Phenolic-Resin-Derived Activated Carbons", Applied Catalysis A: General, Elsevier Science: Oct. 1998, 173(2): 289-311.

Zalc, J.M., et al., "Mixing Dynamics in the SMX Static Mixer as a Function of Injection Location and Flow Ratio," Polymer Engineering & Science, Apr. 2003, USA 43(4): 875-890.

* cited by examiner

POROUS CARBONS

CROSS-REFERENCE TO RELATED APPLICATIONS

This application is a divisional application of U.S. patent application Ser. No. 10/344,248 filed 29 May 2003 now abandoned, which was derived from International Application No. PCT/GB01/03560 filed 7 Aug. 2001. The entire disclosures of these earlier related applications are incorporated herein by reference.

FIELD OF THE INVENTION

The present invention relates to improved phenolic resin structures which can be used as ion exchange resins and can be used to prepare porous carbon materials and to a methods for making these.

BACKGROUND TO THE INVENTION

Sulphonated phenolic resins were first used as ion exchange resins in the 1930's (Adams et al, J Soc Chem Ind. 54, (1935) 1-GT) and relatively stable cation and anion exchange resins were used extensively for the softening and demineralisation of water. Other phenolic based resins include the weak base anion exchange resins that have been primarily used in food processing applications (Cristal M J, Chem and Ind, 814, (1983) Nov. 7) and chelation resins which can be produced to give remarkable selectivity for the adsorption of metal ions such as cesium (U.S. Pat. No. 4,423,159, 1983 and U.S. Pat. No. 5,441,991, 1995). The ion exchange powders, can be produced by either bulk curing of the resin followed by milling (e.g. WO91/09891) to produce a low porosity powder or by reversed phase condensation (Unitaka Ltd U.S. Pat. No. 4,576,969 1986). One of the limitations of these materials was limited internal porosity and they were rapidly replaced by the highly porous sulphonated styrene divinyl benzene copolymer based ion exchange resins when these became available. However, although the phenolic based resins have largely disappeared, specific applications do still exist in food related industries based on their underlying performance characteristics.

The phenolic resins can be carbonised to form mesoporous carbons. Mesoporous carbons are used as adsorbents or catalysts supports and can be used in spherical, granular of thin film form. Existing production methods use gas phase and chemical activation routes to produce mesoporous carbons but, activated carbon, as conventionally produced, is normally microporous (<2 nm pore diameter–IUPAC definition) with little or no pore volume in the mesopore (2-50 nm) and macropore (>50 nm) range. For some critical adsorption processes such as evaporative emission control, and when used as a catalyst support, particularly in liquid phase applications, this is a major drawback.

Conventional activated carbons can be made mesoporous through severe activation but this seriously degrades their mechanical properties and the materials are generally then only available as fine powders. U.S. Pat. No. 4,677,086 discloses the use of chemical activation to produce mesoporous carbons without such severe mechanical degradation and which also can be produced as extrudates. These are however still produced as powders and must then be bound to produce, for instance, extrudate for use in fixed bed gas phase processes. In most cases the binders that can be used are polymeric or ceramic which then restricts the conditions under which the carbons can be used.

Chemical activation can also be used to directly produce mesoporous carbons by pelleting or extruding a plasticised acidic lignin base char and then directly carbonising and activating the mixture as disclosed in U.S. Pat. No. 5,324,703. The production route also leads to a low macroporosity, which can have disadvantages in catalytic and liquid phase processes. The route also has the disadvantage of requiring compounds such as phosphoric acid and zinc chloride as the activating agents, which can cause severe environmental problems and have a major impact on the materials of construction of the process plant.

An alternative route is to carbonise sulphonated styrene—divinylbenzene co-polymers as disclosed in U.S. Pat. No. 4,040,990 and U.S. Pat. No. 4,839,331. These produce carbons directly by pyrolysis with meso/microporosity without recourse to further activation. The materials therefore have good mechanical properties. They are, however, limited to relatively small particle sizes, fixed by the polymer production route, and have a limited range of mesopore structures. They are also very expensive reflecting the high cost of the precursor polymer, the low carbon yields and environmental problems associated with processing polymers containing large amounts of sulphur. The resultant carbons are also contaminated with sulphur, which restricts their use as catalysts supports.

A further route has also been disclosed in U.S. Pat. No. 5,977,016 whereby sulphonated styrene—divinylbenzene co-polymer particles can be formed into pellets in the presence of large volume of concentrated sulphuric acid and then carbonised to give structured materials with both meso- and macroporosity. The route is however complex and expensive with significant environmental problems A further route is disclosed in U.S. Pat. No. 4,263,268 where a mesoporous silica with the desired macroshape (i.e. spheres) is impregnated with a carbon forming polymer, such as phenolic or polyfurfuryl resin and then dissolving the silica template in an alkali. This again is a highly expensive route and is only capable of producing the carbon material in a limited range of shapes and forms

SUMMARY OF THE INVENTION

We have now devised an improved method of producing porous resin structures which can be used to form porous carbons such as mesoporous carbon without, gas phase or chemical activation.

According to the invention there is provided a method for forming a porous resin structure which method comprises the condensation of a nucleophilic component with an electrophilic cross-linking agents in solution in the presence of a pore former.

The condensation can be catalysed or non catalysed.

The invention also provides a method for forming a porous carbon structure in which the porous resin is carbonised to form the porous carbon structure.

BRIEF DESCRIPTION OF THE DRAWINGS

These and other features, aspects, and advantages of the present invention will become better understood with regard to the following description, appended claims, and accompanying drawings where:

DESCRIPTION OF PREFERRED FEATURES

Figure 1:
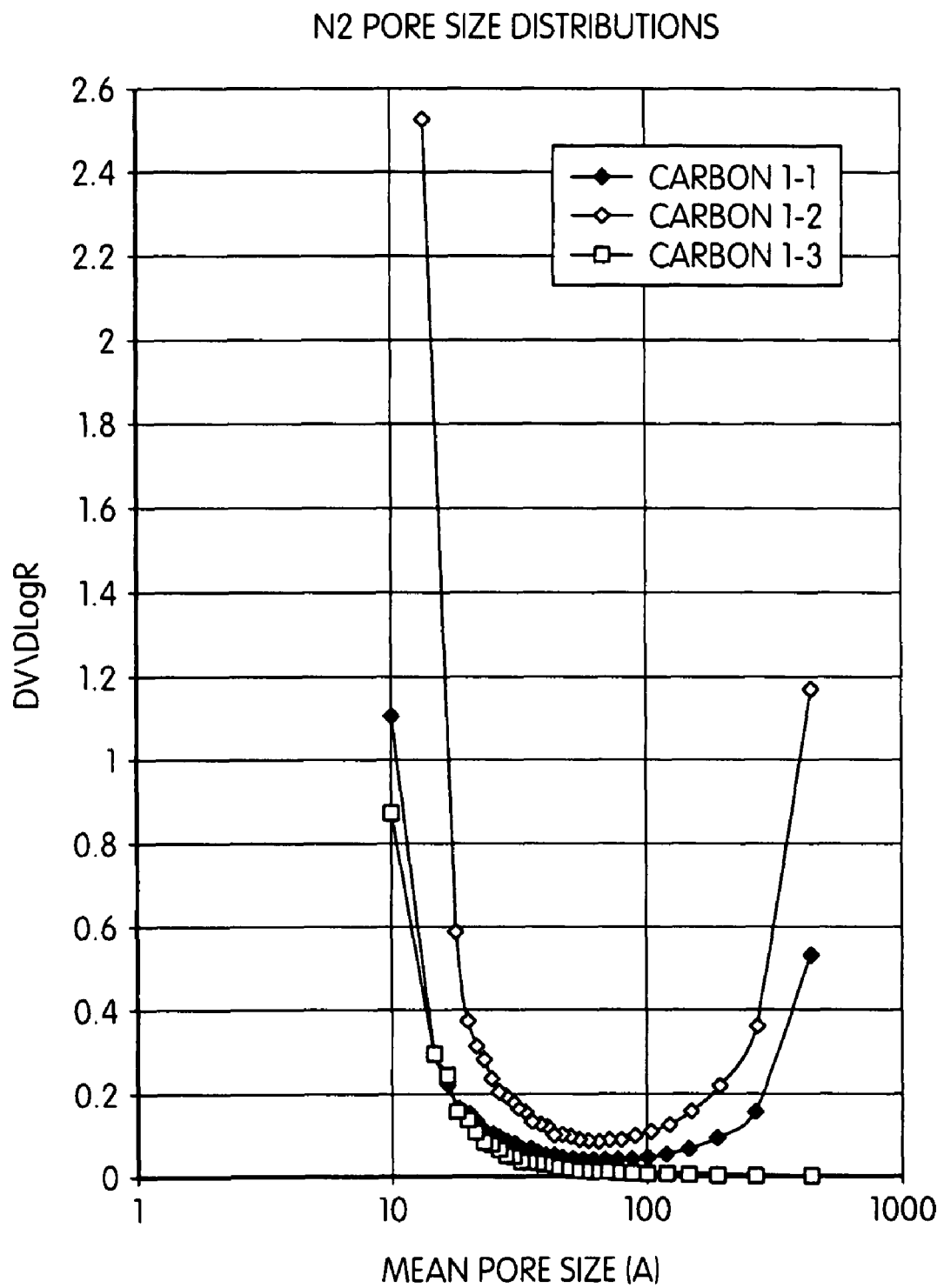
FIG. 1 shows pore former content in the resin composition on the porosity of derived carbonized material with reaction system Phenol-Formaldehyde-Ethylene Glycol-Sulphuric Acid.

The nucleophilic component can be for example phenol, a phenolformaldehyde pre-polymer—a Novolac optionally together with a modifying agent.

The electrophilic component can be for example formaldehyde, hexamine, furfural.

Preferably the pore former acts as the solvent.

Methods for preparation of the porous polycondensation resins generally comprise dissolving nucleophilic components (e.g. phenol, Novolac, modifying reagents) and electrophilic cross-linking components (e.g. formaldehyde, hexamine, furfural) in the pore former with or without catalysts (acidic or basic) and thermosetting the solution obtained to produce cured, solid, insoluble and infusible resins with the pore former evenly distributed within the resin matrix creating pores of controlled size.

The invention is particularly useful for producing porous carbons which can be carbonised to mesoporous/macroporous carbons. By mesoporous carbon we mean here a carbon possessing alongside micropores, pores with diameter from ca. 2 nm to ca. 50 nm and by macroporous a carbon possessing alongside micropores pores with diameters larger than 50 nm, as measured by nitrogen adsorption and mercury porosimetry methods and as defined by IUPAC.

Phenol Polycondensation Pre-Polymer

The phenolformaldehyde condensation pre-polymer can be a Novolac resin. Novolac resins are typically produced by the acid catalysed condensation of phenol and formaldehyde in approximately equimolar amounts. Novolacs are usually thermoplastic solid polymers that melt at or above 100° C. depending on the average molecular weight. They are essentially linear chains with molecular weights of from 500 to 2000 D, where phenolic moieties are linked with methylene (predominantly) and methylene ether bridges and possess one nucleophilic active site, predominantly in the unsubstituted ortho-position to hydroxyl group. There can be also varying degrees of chain branching depending upon the production conditions.

Whilst the commercial materials are largely produced using phenol and formaldehyde, a variety of modifying reagents can be used at the pre-polymer formation stage to introduce a range of different oxygen and nitrogen functionality's and cross-linking sites. These include but are not limited to:—

1. Hydroquinone and resorcinol. Both are more reactive than phenol and can lead to some cross-linking at the pre-polymer production stage. It is also possible to introduce these compounds at the cross-linking stage to provide different cross-linking paths. These also increase the oxygen functionality of the resins.

2. Nitrogen containing compounds that are active in polycondensation reactions, such as urea, aromatic (aniline) and heteroaromatic (melamine) amines. These allow the introduction of specific types of nitrogen functionality into the initial polymer (and final carbon) and influence the development of the mesoporous structure of both the resins and the final carbons.

Like hydroquinone and resorcinol, all the nitrogen containing nucleophilic modifying reagents which can be used in the present invention possess two and more active sites and are more reactive in condensation reactions than phenol or Novolacs. It means that they are first to react with primary cross-linking agents forming secondary cross-linking agents in situ. In the case of melamine it is preferable to prepare the secondary cross-linking agent—hydroxymethylated melamine—in advance.

Novolacs are thermally stable in that they can be heated and cooled repeatedly without structural change. They are cured on addition of cross-linking agents and heating.

The process of the invention is carried out in solution and the pore former can also be the solvent. For example a solution, obtained from commercial Novolac pre-polymers together with modifying reagents (if required), cross-linking agents and catalysts (if required) and an appropriate amount of the pore former as a solvent, is heated to bring about the cross-linking reaction, resulting in a solid resin.

Alternatively the solid porous polycondensation resins which can be used in the invention can be produced directly from phenol (and optionally modifying agents) and formaldehyde (or other cross-linking agents) on heating their solution in the pore former with the catalyst (acidic or basic).

In both cases the reaction solution will set during the cross-linking reaction if the correct composition is used "locking" the pore former into the resin structure and creating a mesoporous resin.

The porous resin precursor can be cast into a block and comminuted to give a powder of particle size in the range of 1 to 1000 microns. This resin powder can then be carbonised to give a porous carbon with a pore size which can be controlled e.g. to give a mean pore size of between 2 and 50 nm (mesopores) or greater than 50 nm (macropores) and also with micropores with a mean pore size between 0.6 and 2 nm.

If the viscous solution of the partially cross-linked pre-polymer is poured into a hot liquid such as mineral oil containing a dispersing agent and the mixture stirred, the pre-polymer solution will form into beads. These are initially liquid and then, as curing proceeds, they become solid. The average bead particle size is controlled by several process parameters including the stirrer type and speed, the oil temperature and viscosity, the pre-polymer solution viscosity and volume ratio of the solution to the oil and can be adjusted between 5 and 2000 microns. These beads can then be filtered off from the oil and, after pore former removal, pyrolysed to give meso- or macroporous carbon beads.

It is thought that the mechanism of mesopore generation is due to a phase separation process that occurs during the cross-linking reaction. In the absence of a pore former, as the linear chains of pre-polymer undergo cross-linking, the molecular weight initially increases. Residual low molecular weight components become insoluble in the higher molecular weight regions causing a phase separation into cross-linked high molecular weight domains within the lower molecular weight continuous phase. Further condensation of light components to the outside of the growing domains occurs until the cross-linked phase becomes essentially continuous with residual lighter pre-polymer trapped between the domains.

Pore Formers

There are a large number of solvents that can be employed as the pore formers. The key requirements for these solvents are: high solubility/compatibility of the reaction components in the solvent; useable viscosity of the pre-polymer/cross-linking agent/solvent solution (this for instance essentially rules out glycerol which gives an unacceptably high viscosity); reasonably high boiling temperature to perform the poly-condensation reaction at a reasonable rate without significant solvent evaporation.

Pore formers which can be used include but are not limited to: ethylene glycol, 1,4-butylene glycol (diols); diethylene glycol, triethylene glycol (diols-ethers); gamma-butyrolactone, propylene carbonate (cyclic esters); dimethylformamide, N-methyl-2-pyrrolidinone (substituted amides, cyclic and linear); monoethanolamine (aminoalcohol).

In the presence of a low level of pore former the pore former is compatible with, and remains within, the cross-linked resin domains, (e.g., <120 parts/100 parts Novolac for the Novolac-Hexamine-Ethylene Glycol reaction system), whilst the remainder forms a solution with the partially cross-linked polymer between the domains. In the presence of higher levels of pore former, which exceed the capacity of the cross-linked resin, the pore former adds to the light polymer fraction increasing the volume of material in the voids between the domains that gives rise to the mesoporosity. In general, the higher the pore former content, the wider micropores and the higher the pore volume.

This phase separation mechanism then provides a variety of ways of controlling the pore development in the cross-linked resin structures. These are: chemical composition and concentration of the pore former; chemical composition and quantity of the cross-linking electrophilic agents, presence, chemical nature and concentration of modifying nucleophilic agents, chemical composition of phenolic nucleophilic components (phenol, Novolac), presence, chemical nature (acidic, basic) and concentration of the catalyst.

To produce the spherical resins by the oil dispersion method referred to above the solvent should also be incompatible with the oil and compatible with water in order to secure the formation of a "water in oil" type emulsion with the beads of the resin solution dispersed in the bulk of the oil, minimise the solvent extraction into the oil and problems with its recovery and enhance simple recovery of the solvent from the solid resin beads by washing with water Both protogenic and aprotic solvents of different classes of organic compounds match these requirements and can be used as pore formers, both individually, in mixtures or mixed with water.

Different solvents, though quite similar in structure, will have different compatibilities with the cross-linked resin. This will then alter the phase separation to varying extents and will then affect the porosity of resins and corresponding carbons. Deliberate addition of water to these polar organic solvents will decrease the compatibility of the resin and the resultant pore former, which could be beneficial for some reaction systems, though water, as one of the reaction products, is inevitably present in any reaction where a carbonylic compound is used as the cross-linking agent.

The common feature of amides as the pore formers is that they normally require deliberate addition of water (2-5%) to promote cross-linking with hexamine. When amides are used as the pore formers the final carbons exhibit no mesoporosity detectable by nitrogen adsorption, but they are of relatively low bulk density, which clearly indicates the presence of big pores (>50 nm).

Some pore formers, under special conditions, are also able to contribute to the cross-linking process. For example, active carbocations can be formed from ethylene glycol in strong acidic media or the methylol derivatives of monoethanolamine and formamide with formaldehyde, which will react as secondary cross-linking agents.

Cross-Linking Agents

The primary cross-linking agents used in the invention are formaldehyde, furfural and hexamethylenetetramine (hexamine). Formaldehyde is introduced either in solution in the pore former or as solid paraformaldehyde, $(CH_2O)_x$. Formaldehyde cross-links phenolic moieties forming —$CH_2$— and —$CH_2$—O—$CH_2$— bridges at ratios depending on the pH of the reaction mixture. Methylene bridges are the only ones formed in strong acidic and strong alkali media, whereas at pH's close to neutral either type of bridges appear. Water is formed as the stoichiometric secondary condensation product at a level depending on the type of bridge formed. 1 mole per mole of formaldehyde in the case of the methylene bridges or 1 mole $H_2O$ per 2 moles $CH_2O$ in the case of the ether bridges. The "condensation" water may then influence the phase separation and mesopore formation process by reducing the compatibility of the water containing pore former with the resin domain depending on the pore forming solvent being used.

Complete cross-linking of phenol with formaldehyde by methylene bridges requires approximately a 1 to 1.5 molar ratio of the reagents. Taking into account the formation of some ether type bridges, the phenol to formaldehyde molar ratio in the resin compositions of the invention is preferably maintained at 1.6 to 1.8 level. This requires an additional 9 to 12 weight parts of formaldehyde (paraformaldehyde) per 100 weight parts of Novolac resin.

Furfural differs from formaldehyde in that the electrophilic reactivity of its carbonyl group is supplemented by the high nucleophilic activity of the heterocyclic. Moreover, ring scission and consecutive reactions can give a wide range of products, which can provide additional cross-linking paths, possibly involving phenolic hydroxyls. These are typical for furan resin derivatives, especially in acidic media and, in combination with other cross linking agents, provide an additional route to modify both the chemical structure and porosity of the resins.

Hexamine can be introduced as a powder directly into the reaction solution. On heating ring cleavage occurs, catalysed by traces of water and, possibly, protonic solvents, resulting in the formation of the active species—aminocarbinols. On cross-linking these form different bridges, including simple methylene and more complex—nitrogen-containing groupings like bis-methylene amine, tris-methylene amine and 1,3-oxazine. The low molecular weight condensation by-products are water, that then cleaves the next portion of hexamine, and ammonia. Ammonia, though highly volatile at the reaction conditions, increases the pH of the reaction solution when no acidic or basic catalysts are present, which may also affect the phase separation and mesopore formation process.

In the present invention hexamine is preferably used for cross-linking Novolac resin at a concentration of 9 weight parts hexamine per 100 weight parts of Novolac. This ensures the formation of the solid resin with maximal cross-linking degree. This is in contrast to previously disclosed sintered resin structures where typically up to 3 parts of hexamine per 100 parts of Novolac were used (EP 0245551). When hexamine is used in the ethylene glycol solution at a level of 3 weight parts per 100 weight parts of Novolac only non-porous semi-solid rubbery material is obtained, whereas at 9 weight parts level a highly mesoporous and solid resin is produced. It is thought that ethylene glycol might act as an internal plasicizer when the cross-linking degree is not adequate.

Modifying Agents

Most of the modifying agents which can be used in the invention contain nitrogen thus introducing this into the resins and therefore the final carbons. Their common feature is their reactivity in condensation reactions, which is higher than that of phenol and Novolac resin. There are at least three distinct ways in which these compounds participate in the condensation process when added in relatively small amounts (5-30 weight % of the phenolic component):

1. Novolac-primary cross-linking agent-modifying agent reaction system. Here the modifying agent reacts rapidly with the primary cross-linking agent forming a secondary cross-linking agent that then binds the Novolac chains together. As a result the resin consists of homocondensed phenolformaldehyde chains bridged with nitrogen-containing groupings (or resorcinol or hydroquinone derived moieties).

2. Phenol-cross-linking agent-modifying agent-strong acidic or strong basic catalyst. Separate homocondensation processes occur for the two different nucleophilic reagents (phenol and modifying agent). This then results in the formation of a binary resin matrixes where the two resin components behave in a different way on thermal treatment.

3. Phenol-cross-linking agent-modifying agent-weak acidic or weak basic catalysts, or no catalyst at all. This leads to a co-condensation process with formation of structurally homogeneous material with modifying moieties evenly distributed within phenolic resin.

For the three different cases the effect of the modifying agent on the porosity of both resin produced and final carbon can be different. Thus, for the reaction system phenol-aniline-formaldehyde-ethylene glycol-sulphuric acid (strong acid as a catalyst) increasing the amount of aniline from 0 to 20 mol. % relative to the phenol leads to a gradual narrowing of mesopores. Conversely in the case of Novolac-aniline-hexamine-ethylene glycol and Novolac-aniline-formaldehyde-ethylene glycol reaction systems (no catalyst at all) increasing the amount of aniline from 0 to 20 weight % relative to the Novolac produces a pronounced increase in both mesopore width and volume.

Reaction Rate Effects

Besides pure catalytic effects, such as increasing the reaction rate and changing the reaction paths, strong acids and alkalis enhance dramatically the solubility and compatibility of growing resin chains and aggregates in the polar pore former due to phenolate formation (for alkalis) or protonation (for acids). Too high catalyst concentrations can also result in enhancing some undesirable reactions, such as decomposition of amide and ester pore formers, disproportionation of aldehydes (alkali catalysed Cannizzaro reaction), blocking of active sites of benzene rings due to sulphonation (with sulphuric acid as a catalyst). Too low catalyst concentrations can result not only in considerable slowing down of condensation reaction, but also in a deterioration of porosity.

The development of mesoporosity within a resin of constant composition is also dependent upon the rate of the cross-linking reaction. The condensation reaction rate can be controlled by the reaction temperature and also via heat transfer phenomena which are controlled by the physical form of the resin (block, beads, etc). This is found in the preparation of the spherical resin, where heat transfer phenomena can be ignored because the process is carried out in hot oil with small resin droplets. If the solid cured spherical resin is prepared from a solution of Novolac and hexamine in ethylene glycol by smoothly increasing the temperature to 100-105° C. (solution quite close to gel state), dispersing the solution into the oil at about the same temperature, and then gradually raising the temperature to 150-160° C. to complete the cross-linking a highly mesoporous resin is formed. Conversely, if the Novolac and hexamine are dissolved in ethylene glycol at 65-70° C. and directly dispersed into the oil at 160-180° C., the mesoporosity of the resulting cured resin will be dramatically decreased. On carbonisation the first resin produces highly mesoporous carbon with moderate to low microporosity. The second resin produces carbon with relatively high microporosity, but low mesoporosity.

It is thought that, when the cross-linking proceeds very quickly under the temperature shock conditions, aggregates of relatively small domains are formed instead of the normal sized domains formed under mild curing conditions. The voids between the small domains in the aggregates then give rise to additional microporosity. And few voids between the aggregates create some mesoporosity.

It has also been found that the way in which the pore former is removed from the cured resin can be important to the generation of the porosity in corresponding carbon. If the pore former (e.g., ethylene glycol) is removed simply on pyrolysis during the carbon production, the mesoporosity may be lost. It has been found that it is preferable to remove the pore former at a low temperature, e.g., below 100° C., via washing the resin with water or vacuum distillation, with subsequent recycling of the pore former. The washing (sometimes—after neutralisation) becomes absolutely necessary, when alkalis or sulphuric acid are used as catalysts. This is because alkalis will affect the carbonisation process, sometimes in very undesirable way, whereas sulphuric acid will contaminate the carbon with sulphur, reducing its value as a catalysts supports.

Other Additions

It has also been found that heteroatoms can be incorporated in the resin structure. Metals such as copper, nickel, chromium etc, can be incorporated in the porous resin structure by incorporating the metal as a solution of a salt in the pore forming solvent prior to cross linking the resin and non metals and metalloids can be incorporated directly into the mesoporous resin and thence into the mesoporous carbons. Where an inorganic compound is soluble in the pore former it can be added directly to the initial reaction solution. The preparation procedure is then carried out in the usual way. The metal species are then evenly distributed within the resin matrix. In some cases the ability of the element to complex with or have some other specific interaction with, the hydroxy- or amino-groups of phenolic resin enhances the initial distribution to the atomic level. Incorporation of the highly dispersed element within the resin then leads to a high dispersion of the element in the carbon formed during pyrolysis.

Carbonisation and Activation

The transformation of the porous resins in any physical form and shape into the porous carbons of the invention is performed by carbonisation, i.e. high temperature treatment in an inert atmosphere and at temperatures from ~600° C. upwards. The pyrolysis process commences at about 400° C. and is largely complete by around 700° C. although further small weight losses continue up to around 1400° C. However surface area development is only significant above around 600° C. at which point the material is not strictly carbon. The development of a significant electrical conductivity is only observed at above 700° C. The inert atmosphere for the pyrolysis can be secured by the appropriate gas flow. Nitrogen and argon can be used as inert purge gases at any temperature whilst carbon dioxide is effectively inert up to around 800° C. in the absence of catalytic metals. Vacuum may also be used although this can lead to the development of molecular sieving behaviour. Due to the presence of mesopores in these materials, which provide efficient escape routes for the volatile products, the heating rates employed can be very high—up to 10° C. per minute. The porosity of the carbons can be further enhanced by conventional activation methods, e.g. by activation in steam above 750° C. or carbon dioxide above 800° C., which can give surface areas as measured by BET 5 point method of up to 2000 $m^2/g$. It has been found that "physical" activation with carbon dioxide at the temperatures in the range 850-900° C. gives rise predominantly to microporosity, whereas air activation at 420-450° C. enhances rather mesopore size and volume e.g. in the same pore size and range as in the original carbon.

It is a feature of the present invention that it enables there to be produced spherical porous carbon structures with a controlled range of particle size e.g. where the size distribution of the spheres can be controlled to give a dispersion of D90/D10 of better than 10 (preferably better than 5) and the larger pores can be controlled from a mean diameter of 2 nm up to 50 nm (mesopores) or greater than 50 nm (macropores) and where the mean micropore diameter can be controlled to between 0.6 and 2 nm to give BET surface areas from 250 to 800 $m^2/g$ without recourse to conventional activation procedures.

The materials of the present invention can be advantageously used in a wide variety of demanding applications where the high physical strength and high attrition resistance offer special benefits. These include, but are not limited to, liquid phase catalyst supports, blood filtration and any application where the carbon is used in a fluid bed or moving bed environment. The large mesopores can also be advantageously utilised in system where larger molecules are either adsorbed or grafted within the pores. These can include drug release systems, chiral supports etc.

The invention is illustrated in the following examples.

Example 1

A reaction mixture containing 94 weight parts of phenol, 54 weight parts of paraformaldehyde (PF) (phenol to formaldehyde molar ratio 1:1.8), specified amounts of ethylene glycol (EG) pore former and concentrated sulphuric acid (SA) was heated with stirring up to specified condensation temperature (paraformaldehyde dissolves completely at about 60° C.) and maintained at this temperature for a specified residence time (Table 1-1).

TABLE 1-1

| # | EG, weight parts | SA, weight parts | Condensation temperature, °C. | Residence time, minutes |
|---|---|---|---|---|
| 1 | 259 | 35.4 | 72 ± 1 | 80 |
| 2 | 370 | 45 | 77 ± 1 | 120 |
| 3 | 259 | 17.0 | 72 ± 1 | 300 |

The resulting viscous solution was poured as a stream into 2-4 volumes of stirred preheated (110-115° C.) mineral oil containing 0.5% of a drying oil, acting as a dispersing agent. The temperature of the resulting mixture dropped to ~100-102° C., and cross-linking occurred normally within 1-2 minutes. The resulting slurry was gradually heated up to 115-120° within 30-60 minutes to complete the curing and cooled down. Resin in bead form was filtered off from the oil, washed several times with hot water to remove both pore former and catalyst. The resulting porous spherical resin, containing water, residual oil, traces of pore former and catalyst can then be directly carbonised to produce spherical porous carbon For analysis of the resin it can be washed repeatedly with organic solvent, preferably with ethanol-ether 1:1 v/v solution, and dried in vacuo until constant weight. The pore size distribution graphs and some structural parameters of carbonised materials, formed by heating at 800° C., in carbon dioxide flow, are given in FIG. 1 and Table 1-2. In which the effect of the pore former content and catalyst's concentration in the resin composition on the porosity of derived carbonised material is shown. Reaction system Phenol-Formaldehyde-Ethylene Glycol-Sulphuric Acid.

TABLE 1-2

| | BET area, $m^2/g$ | Pore Volume ($P/P_0 = 0.98$), $cm^3/g$ | Bulk Density, $g/cm^3$ |
|---|---|---|---|
| Carbon 1.1 | 571.1 | 0.58 | 0.34 |
| Carbon 1.2 | 598.2 | 0.90 | 0.32 |
| Carbon 1.3 | 475.7 | 0.26 | 0.69 |

Example 2

A reaction mixture containing 94 weight parts of phenol, specified amounts of aniline (A), ethylene glycol pore former, paraformaldehyde and concentrated sulphuric acid was heated with stirring up to specified condensation temperature (complete paraformaldehyde dissolution occurs around 60° C.) and maintained at this temperature for specified residence time (see Table 2-1).

TABLE 2-1

| # | EG, weight parts | PF, weight parts | A, weight parts | SA, weight parts | Condensation temp. °C. | Residence time, min. |
|---|---|---|---|---|---|---|
| 1 | 272 | 56.7 | 4.7 | 37.2 | 73 ± 1 | 105 |
| 2 | 284 | 59 | 9.3 | 39 | 73 ± 1 | 115 |
| 3 | 310.5 | 64.8 | 18.6 | 42.4 | 73 ± 1 | 140 |
| 4 | 336.2 | 70.2 | 27.9 | 45.9 | 73 ± 1 | 180 |

Figure 2:
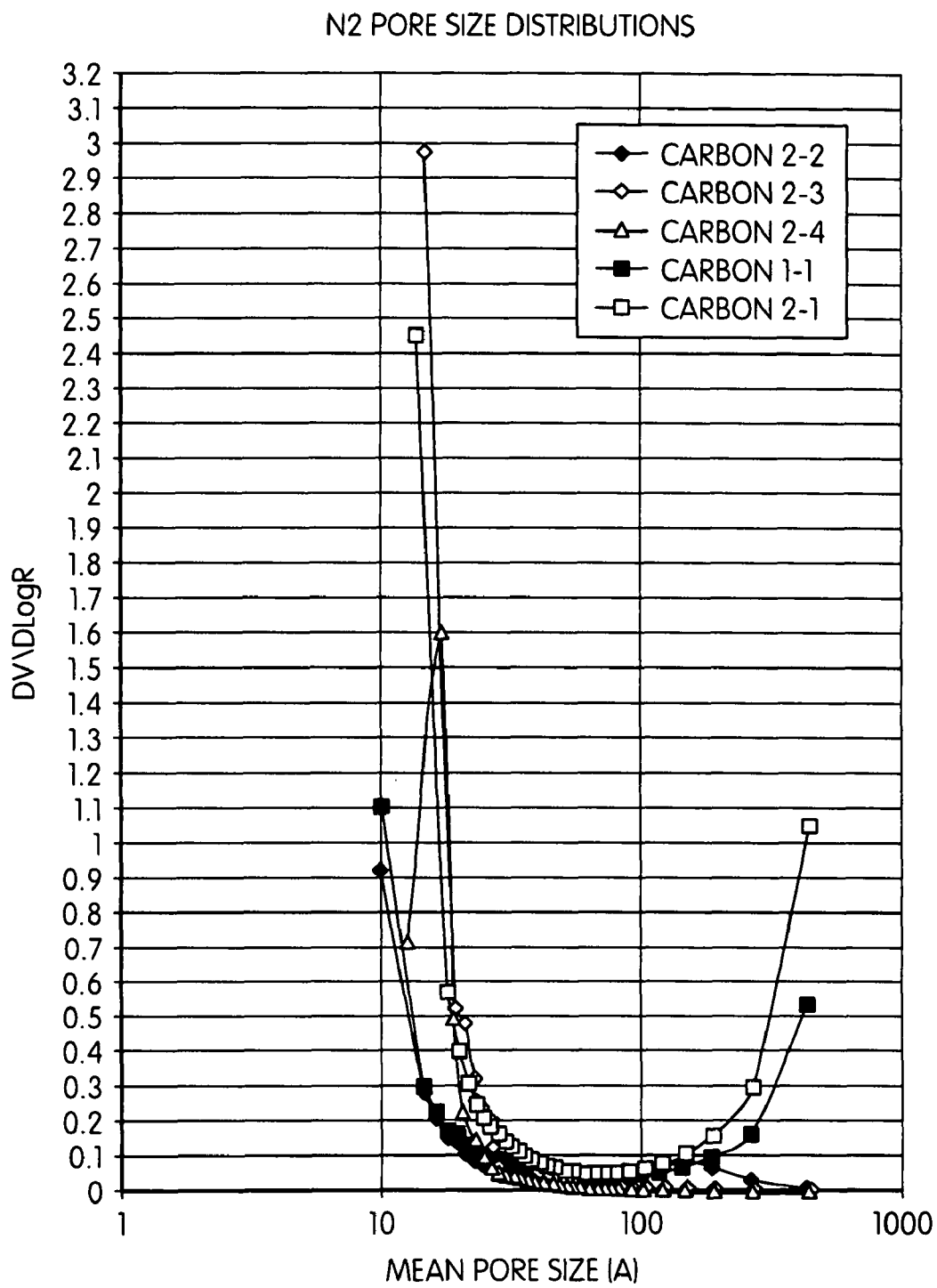
FIG. 2 shows the effect of aniline content in resin composition of the reaction system Phenol-Aniline-Formaldehyde-Ethylene Glycol-Sulphuric Acid on the porosity of derived carbons.

The resulting viscous solution was poured in a stream into 2-4 volumes of stirred preheated (110-115° C.) mineral oil containing 0.5% of the drying oil and the resin was processed further in the same way as in Example 1. The pore size distribution graphs and some structural parameters of carbons 2.1 to 2.4 and carbon 1.1 are compared in FIG. 2 and Table 2-2, in which is shown the effect of aniline content in resin composition of the reaction system Phenol-Aniline-Formaldehyde-Ethylene glycol-Sulphuric acid on the porosity of derived carbons.

TABLE 2-2

|           | BET area, $m^2/g$ | Pore Volume ($P/P_0 = 0.98$), $cm^3/g$ | Bulk Density, $g/cm^3$ |
|-----------|-------------------|----------------------------------------|------------------------|
| Carbon 1.1 | 571.1 | 0.58 | 0.34 |
| Carbon 2.1 | 526.7 | 0.78 | 0.40 |
| Carbon 2.2 | 516.7 | 0.31 | 0.76 |
| Carbon 2.3 | 441.8 | 0.24 | 0.87 |
| Carbon 2.4 | 293.9 | 0.16 | 0.83 |

Example 3

Industrial Novolac resin in amount of 100 weight parts was mixed together with specified amount of ethylene glycol pore former (see Table 3-1) at elevated temperature and with stirring to enhance the formation of a clear solution, which was then cooled down to 65-70° C., where hexamine (HA) in amount of 9 weight parts was added. The resulting stirred mixture was gradually heated at such a rate as to reach the specified temperature in specified residence time (see Table 3-1).

TABLE 3-1

| # | EG, weight parts | EG: Novolac + HA | Ultimate pre-condensation temp., ° C. | Condensation residence time, min. |
|---|------------------|------------------|---------------------------------------|-----------------------------------|
| 1 | 109 | 1.00 | 85 | 30-35 |
| 2 | 136.3 | 1.25 | 90 | 30-35 |
| 3 | 163.5 | 1.50 | 100 | 45-50 |
| 4 | 190.8 | 1.75 | 102 | 70-75 |
| 5 | 218 | 2.00 | 104 | 75-80 |
| 6 | 272.5 | 2.50 | 105 | 75-80 |
| 7 | 327 | 3.00 | 105 | 80-85 |
| 8 | 381.5 | 3.50 | 106 | 80-85 |
| 9 | 436 | 4.00 | 107 | 85-90 |

Figure 3A:
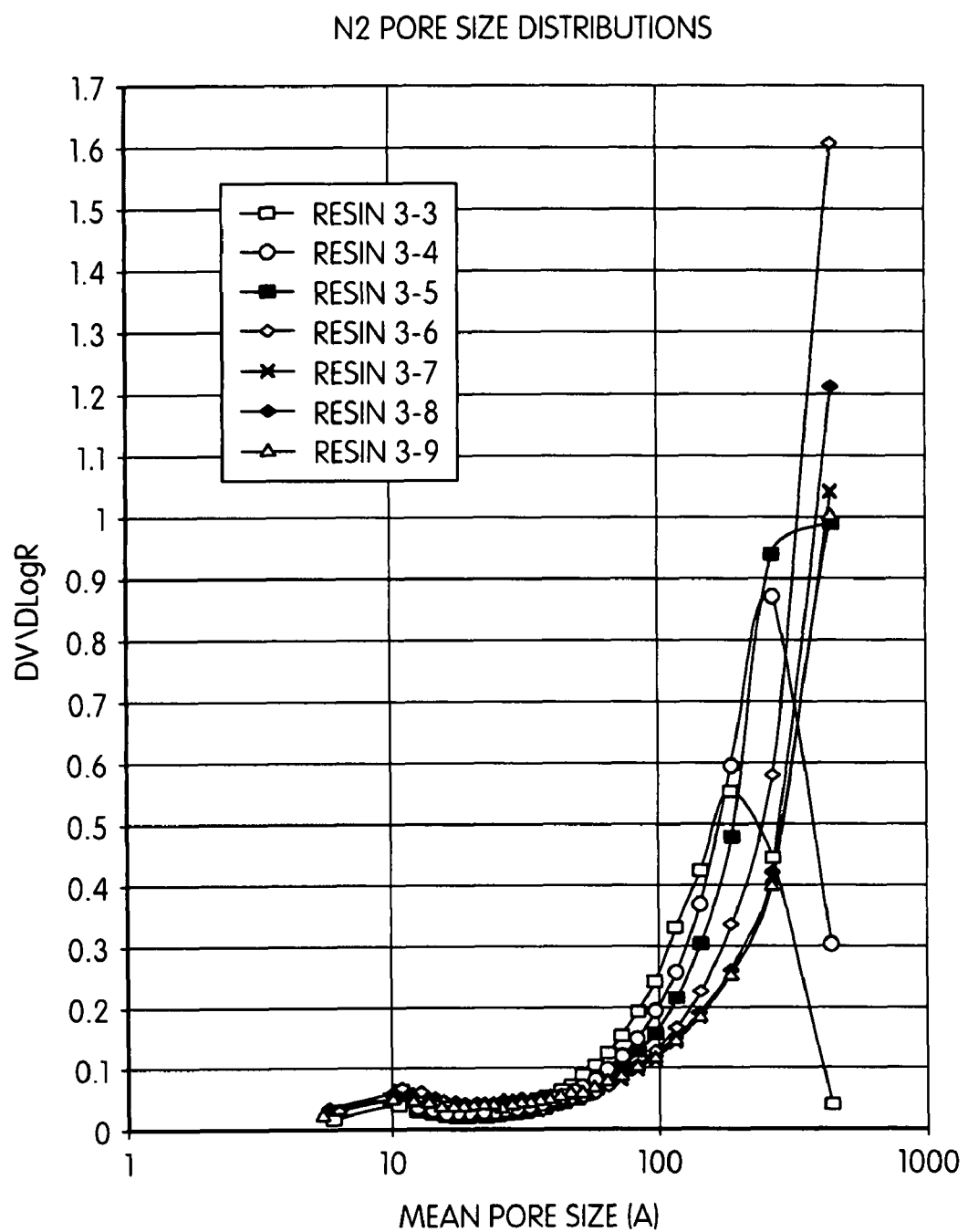
FIG. 3a shows the effect of the pore former content on the porosity of phenolic resins with reaction system Novolac-Hexamine-Ethylene Glycol.

The viscous solution was then poured in stream into 2-4 volumes of stirred preheated (115-120° C.) mineral oil containing 0.5% of the drying oil. The temperature of resulting emulsion dropped to 105-110° C., but on further heating cross-linking occurred at about 115-120° C. Further heating at the rate about 0.5° C. per minute up to 150° C. was applied to complete the curing. After cooling down the resin beads were filtered off from the oil and washed several times with hot water to remove the pore former and small amount (less than 5% of total) of low molecular weight polymer. The resulting porous spherical resin, containing water, residual oil, traces of pore former and low molecular weight fraction was carbonised by heating at 800° C. in flowing carbon dioxide to produce the spherical porous carbon. If the resin beads are carbonised directly after separation from the oil, without washing, the porosity of resulting carbons decreases. For analysis the sample of resin should be washed repeatedly with organic solvent, preferably with ethanol-ether 1:1 v/v solution, and dried in vacuo until constant weight. The pore size distribution graphs and some structural parameters of both resins and carbonised materials are presented on FIGS. 3a and 3b and Tables 3-2 and 3-3, respectively.

TABLE 3-2

|           | BET area, $m^2/g$ | Pore Volume ($P/P_0 = 0.98$), $cm^3/g$ |
|-----------|-------------------|----------------------------------------|
| Resin 3.1 | Non-porous | Non-porous |
| Resin 3.2 | Slightly porous | Slightly porous |
| Resin 3.3 | 98.9 | 0.35 |
| Resin 3.4 | 118.2 | 0.54 |
| Resin 3.5 | 141.1 | 0.81 |
| Resin 3.6 | 144.7 | 0.97 |
| Resin 3.7 | 111.3 | 0.67 |
| Resin 3.8 | 134.9 | 0.76 |
| Resin 3.9 | 120.0 | 0.66 |

Figure 3B:
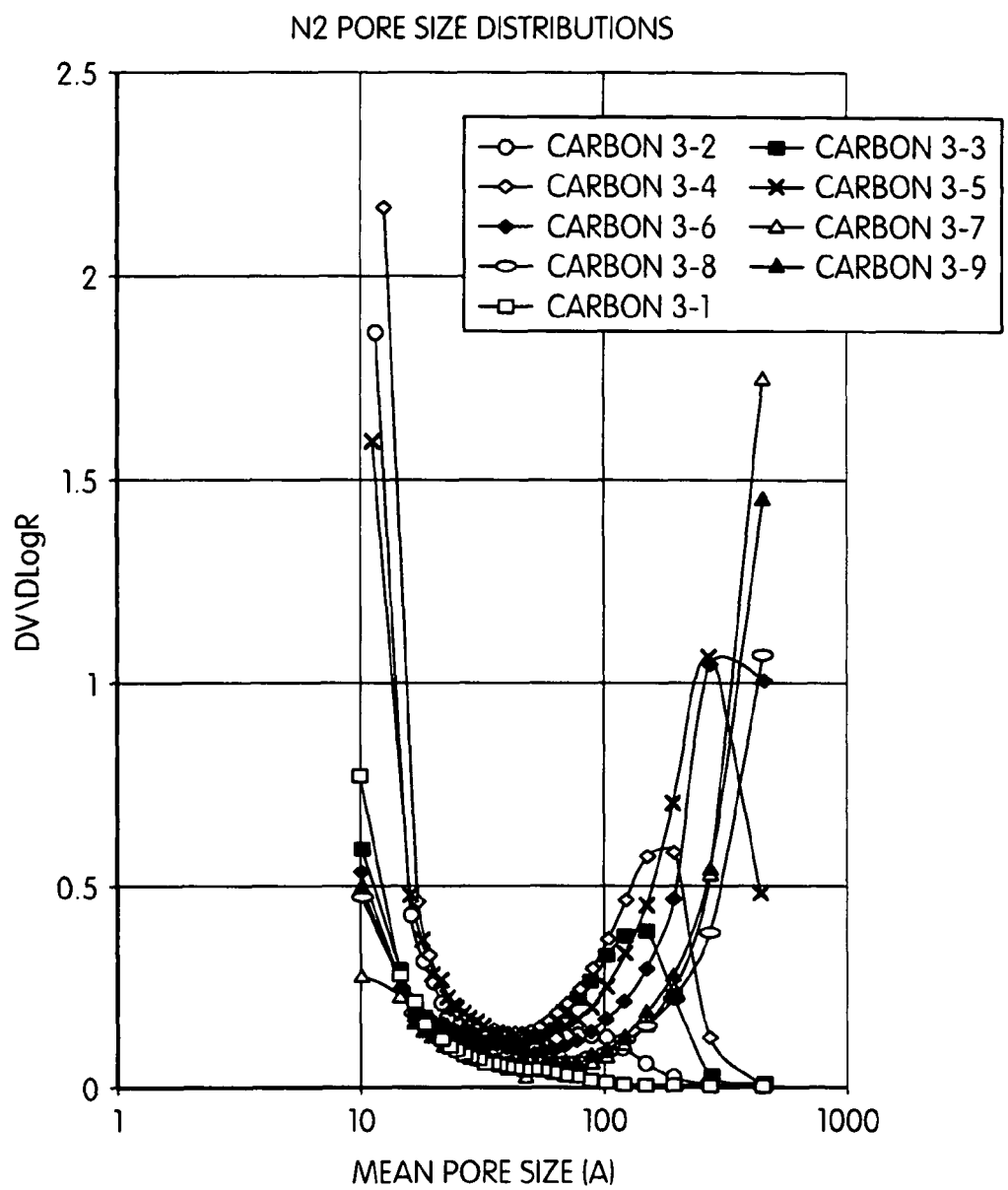
FIG. 3b shows the effect the effect of the pore former in resin composition on the porosity of corresponding carbonized materials with reaction system Novolac-Hexamine-Ethylene Glycol.

FIG. 3b shows the effect of the pore former in resin composition on the porosity of corresponding carbonised materials. Reaction system Novolac-Hexamine-Ethylene Glycol for carbons 3.1 to 3.9.

TABLE 3-3

|            | BET area, $m^2/g$ | Pore Volume ($P/P_0 = 0.98$), $cm^3/g$ |
|------------|-------------------|----------------------------------------|
| Carbon 3.1 | 473.2 | 0.26 |
| Carbon 3.2 | 468.3 | 0.30 |
| Carbon 3.3 | 592.2 | 0.48 |
| Carbon 3.4 | 567.3 | 0.54 |
| Carbon 3.5 | 579.6 | 0.88 |
| Carbon 3.6 | 525.1 | 1.02 |
| Carbon 3.7 | 469.3 | 1.13 |
| Carbon 3.8 | 482.0 | 0.84 |
| Carbon 3.9 | 524.8 | 1.06 |

Example 4

Industrial Novolac resin (N) in amount of 100 weight parts was mixed together with specified amount of ethylene glycol pore former (EG) (see Table 4-1) at elevated temperature and on stirring to enhance the formation of clear solution, which then was cooled down to 65-70° C. where specified amounts of hexamine (HA) and modifying agent (MA)—aniline (A) or urea (U), were added.

TABLE 4-1

| # | EG, w.p. | HA, w.p. | A, w.p. | U, w.p. | EG: N + HA + MA | CT, ° C. | RT, min |
|---|----------|----------|---------|---------|-----------------|----------|---------|
| 1 | 246.4 | 13.2 | 10 | — | 2.0 | 91 | 35 |
| 2 | 288 | 24 | 20 | — | 2.0 | 80 | 50 |
| 3 | 246.4 | 13.2 | — | 10 | 2.0 | 103 | 75 |
| 4 | 288 | 24 | — | 20 | 2.0 | 103 | 60 |

Figure 4:
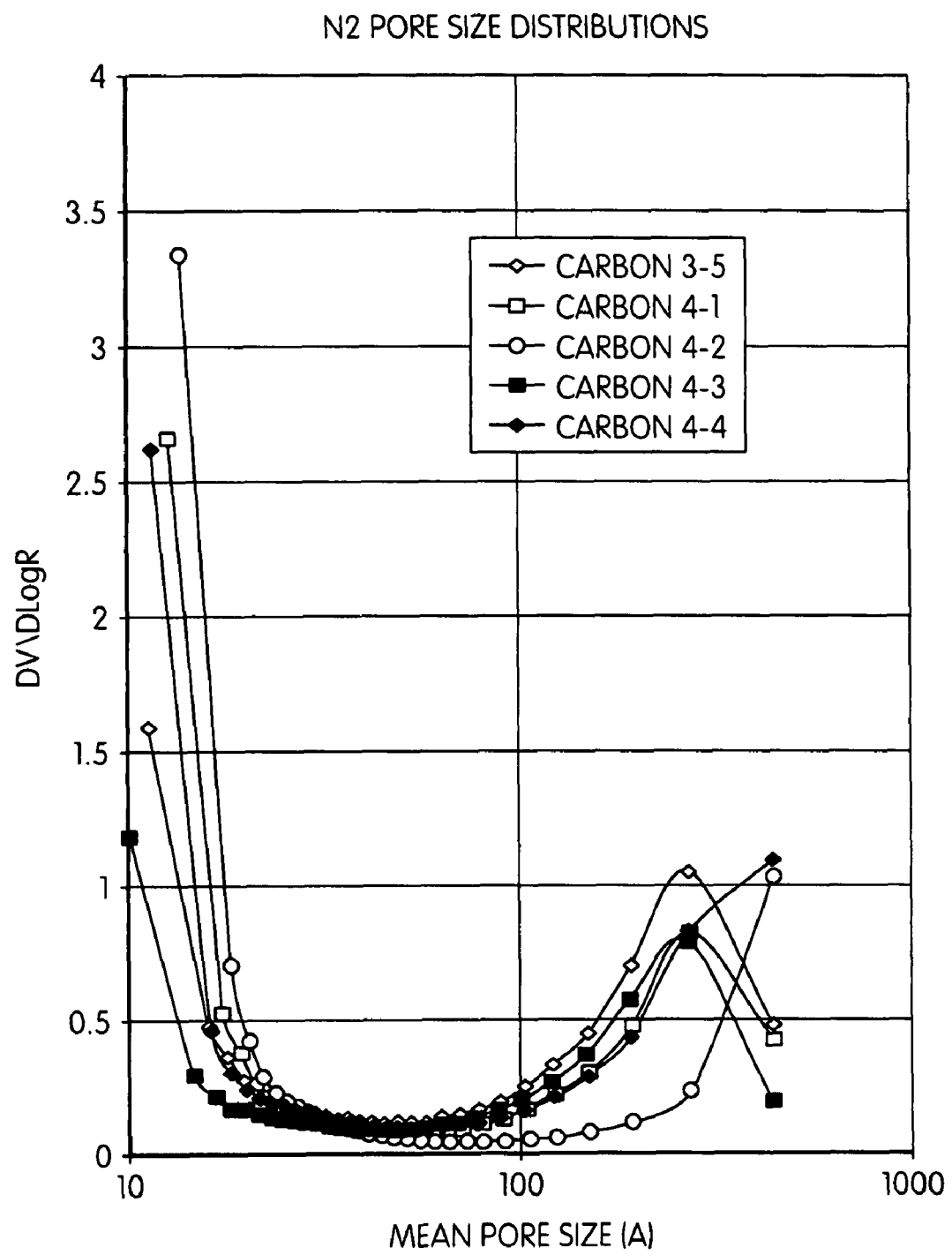
FIG. 4 shows the effect of additions of Aniline or Urea to the resin compositions of Novolac-Hexamine-Ethylene Glycol reaction system on the porosity of resulting carbons.

The resulting stirred mixture was gradually heated at such a rate as to reach the specified temperature (CT) in specified residence time (RT) (Table 4-1). Then the viscous solution was poured as a stream into 2-4 volumes of stirred pre-heated (110-115° C.) mineral oil containing 0.5% of the drying oil. The temperature of the resulting emulsion dropped to 100-105° C., but on further heating cross-linking occurred at about 105-110° C. Further heating at a rate of about 0.5° C. per minute up to 150° C. was applied to complete the curing. After cooling down the resin beads were processed further in the same way as in Example 3. The pore size distribution graphs and some structural parameters of the carbonised materials carbons 4.1 to 4.4 (800° C., flowing carbon dioxide) are compared with those of the carbon 3.5 in FIG. 4 and Table 4-2

TABLE 4-2

|  | BET area, m²/g | Pore Volume (P/P₀ = 0.98), cm³/g |
|---|---|---|
| Carbon 3.5 | 578.6 | 0.88 |
| Carbon 4.1 | 612.6 | 0.77 |
| Carbon 4.2 | 629.6 | 0.81 |
| Carbon 4.3 | 648.1 | 0.73 |
| Carbon 4.4 | 717.0 | 1.08 |

Example 5

A clear solution of 100 weight parts of industrial Novolac resin in 327 weight parts of specified pore former (see Table 5-1) was heated up to 65-70° C. where 9 weight parts of hexamine were added. The resulting reaction mixture was gradually heated on stirring to reach the ultimate condensation temperature of 105-107° C. in 75-80 minutes.

TABLE 5-1

| # | Pore Former, weight parts | PCT, ° C. | RT, min |
|---|---|---|---|
| 1 | 1,4-Butylene glycol, 327 | 105 | 85 |
| 2 | 1,2-Propylene carbonate, 327 | 108 | 70 |
| 3 | Di(ethylene glycol), 327 | 103 | 90 |
| 4 | Tri(ethylene glycol), 327 | 104 | 80 |
| 5 | γ-Butyrolactone, 191 - Water, 11 | 106 | 60 |
| 6 | Dimethylformamide, 278 - Water, 5.5 | 120 | 100 |
| 7 | N-Methyl-2-pyrrolidinone, 327 - Water, 5.5 | 122 | 80 |

Figure 5:
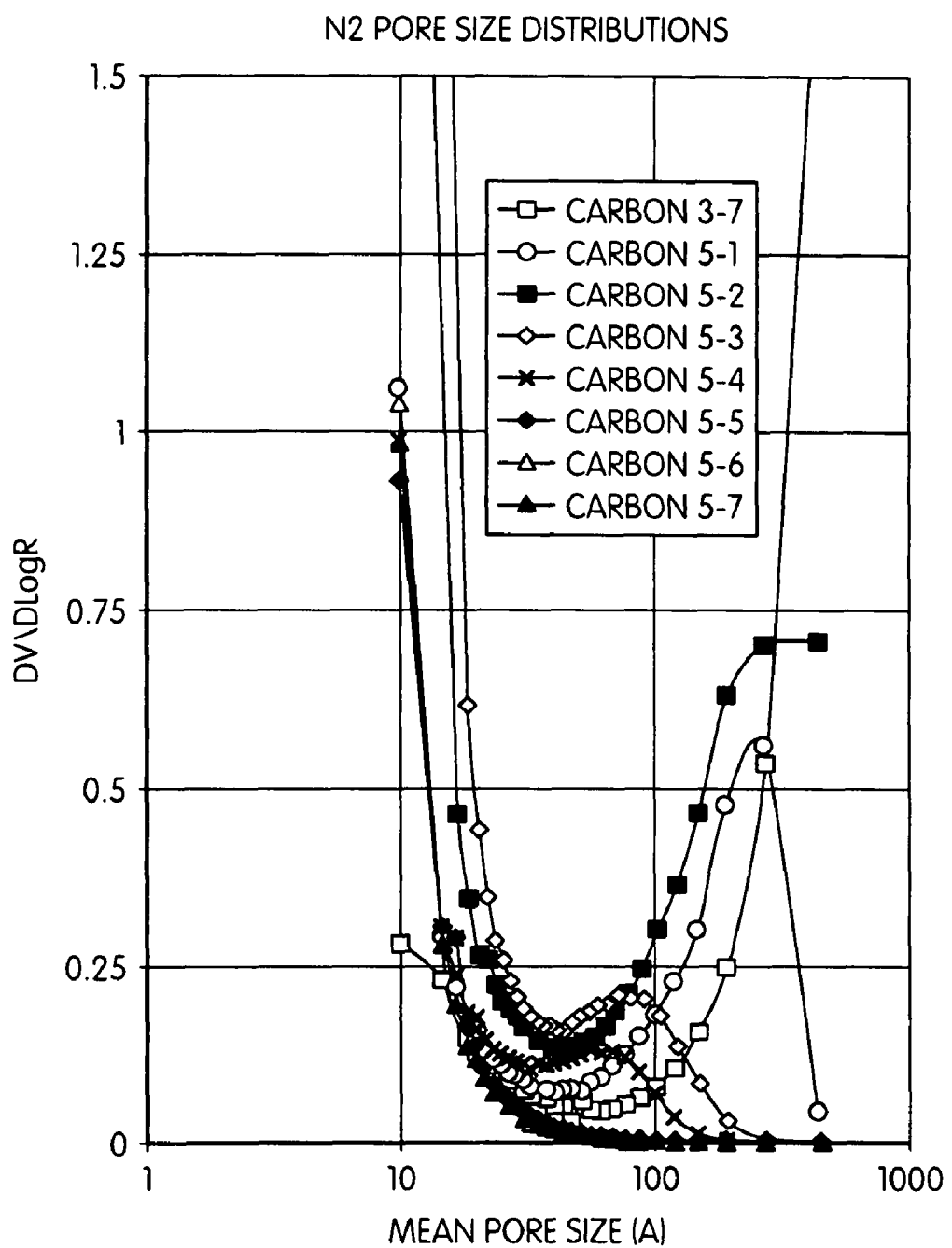
FIG. 5 shows the effect of the nature of the pore former on the porosity of the carbons derived from the resins of reaction systems Novolac-Pore Former-Hexamine.

Then the viscous solution was poured as a stream into 2-4 volumes of stirred pre-heated (115-120° C.) mineral oil containing 0.5% of the drying oil. The temperature of the resulting emulsion dropped to 110-115° C., but on further heating cross-linking occurred, normally at about 120° C. The further processing was the same as in Examples 3 and 4. The pore size distribution graphs and some structural parameters of carbonised materials obtained by heating at 800° C., in carbon dioxide or nitrogen flow, carbons 5.1 to 5.8 are presented in FIG. 5 and Table 5-2 and compared with those of carbon 3.7.

TABLE 5-2

|  | BET area, m²/g | Pore Volume (P/P₀ = 0.98) cm³/g | Bulk Density, g/cm³ |
|---|---|---|---|
| Carbon 3.7 | 469.3 | 1.13 | 0.30 |
| Carbon 5.1 | 586.0 | 0.57 | 0.47 |
| Carbon 5.2 | 621.0 | 0.92 | 0.67 |
| Carbon 5.3 | 556.4 | 0.37 | 0.76 |
| Carbon 5.4 | 548.1 | 0.33 | 0.75 |
| Carbon 5.5 | 498.5 | 0.27 | 0.73 |
| Carbon 5.6 | 524.2 | 0.28 | 0.33 |
| Carbon 5.7 | 511.8 | 0.28 | 0.33 |

Example 6

A clear solution of 100 weight parts of industrial Novolac resin and 9 weight parts of hexamine in 327 weight parts of the pore former of specified composition (see Table 6-1) was processed exactly as in Example 5.

TABLE 6-1

| # | Di(ethylene glycol), w.p. | Ethylene glycol, w.p. | Water, w.p. |
|---|---|---|---|
| 1 | 272.5 | — | 54.5 |
| 2 | 218 | — | 109 |
| 3 | 163.5 | 163.5 | — |

Figure 6:
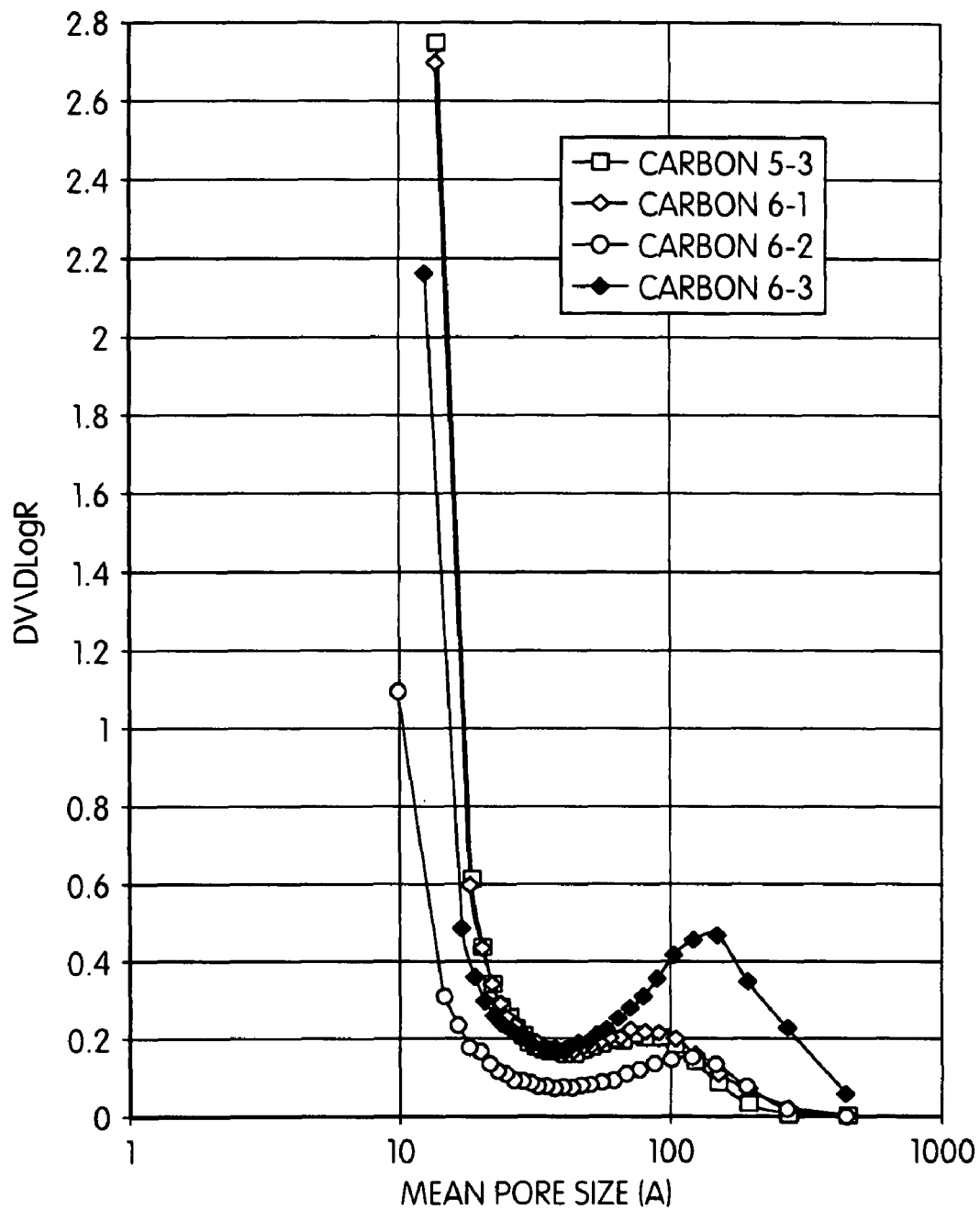
FIG. 6 shows the effect of the pore former modification with another solvents in the resin compositions based on Novolac and Hexamine on the porosity of derived carbon.

The pore size distribution graphs and some structural parameters of carbonised materials obtained by heating at 800° C., in flowing carbon dioxide are presented in FIG. 6 and Table 6-2 carbons 6.1 to 6.3 and compared with those of carbon 5.3.

TABLE 6-2

|  | BET area, m²/g | Pore Volume (P/P₀ = 0.98) cm³/g |
|---|---|---|
| Carbon 5.3 | 556.4 | 0.37 |
| Carbon 6.1 | 561.2 | 0.39 |
| Carbon 6.2 | 585.0 | 0.38 |
| Carbon 6.3 | 606.1 | 0.58 |

Example 7

Figure 7:
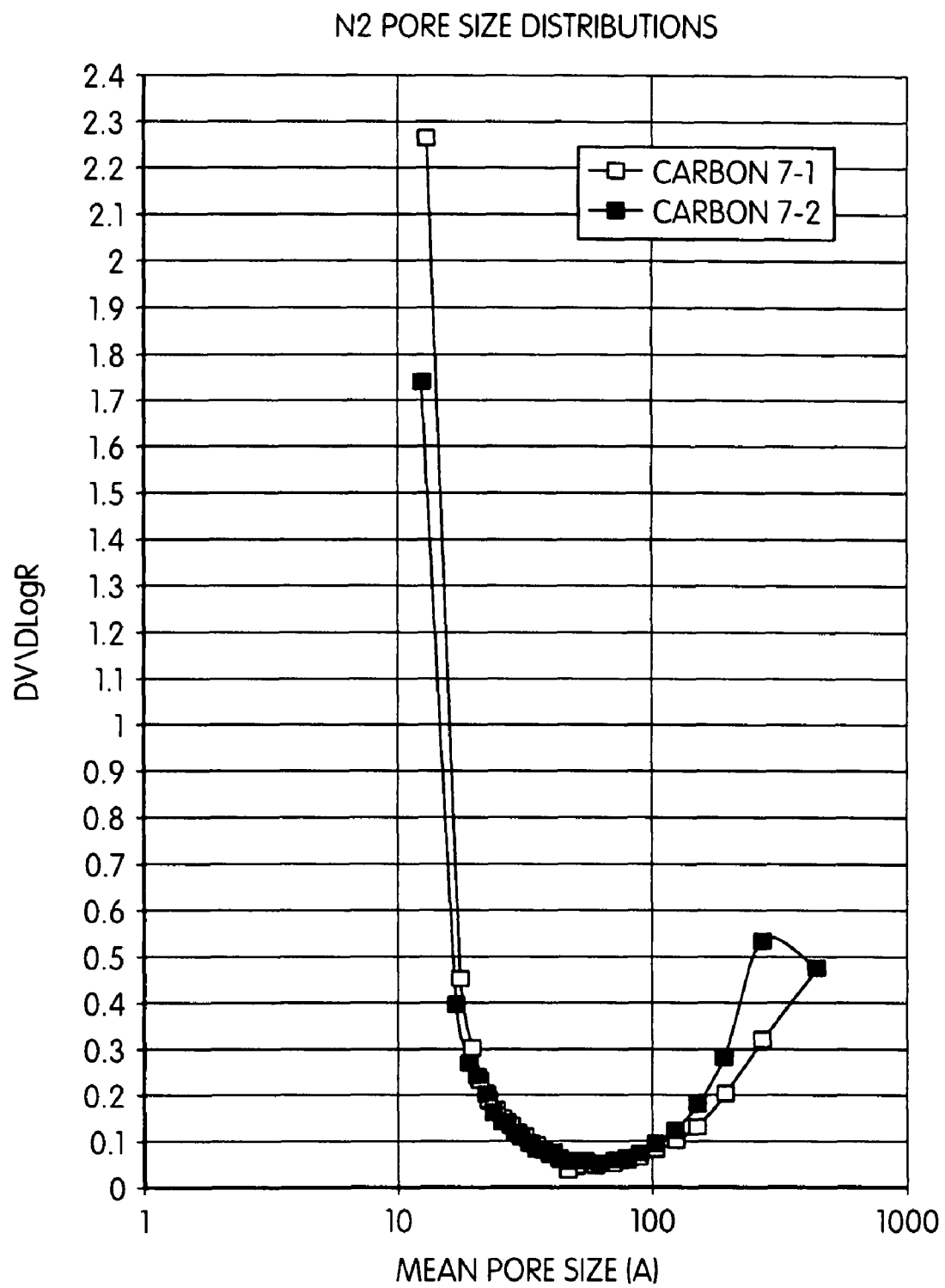
FIG. 7 shows the effect of carbonization procedure on the porosity of carbons derived from copper-containing resin.

A reaction solution containing 100 weight parts of industrial Novolac resin, 12 weight parts of hexamine, 7 weight parts of anhydrous copper(II) sulphate, 190.4 weight parts of ethylene glycol and 33.6 weight parts of monoethanolamine (catalyst and pore former) was gradually heated from 60 to 100° C. in 35-40 minutes. Then the viscous solution was poured in a stream into stirred pre-heated (115-120° C.) mineral oil containing 0.5% of the drying oil. After the initial drop in the resulting emulsion temperature to 110-112° C. further heating was applied at the rate 0.5° C. per minute up to 150° C. Normally cross-linking occurred at 115-120° C. The processing of the resin in beads was the same as in Examples 3-6. FIG. 7 and Table 7 present pore size distributions and some structural parameters of the carbons derived from this resin and containing ca. 5% weight. of finely dispersed copper. Carbon 7.1 was prepared by heat treatment of the resin at 800° C. in flowing carbon dioxide. Carbon 7.2 was prepared by heat treatment of the resin at 800° C. in flowing nitrogen.

TABLE 7

|  | BET area, m²/g | Pore Volume (P/P₀ = 0.98), cm³/g |
|---|---|---|
| Carbon 7.1 | 479.3 | 0.55 |
| Carbon 7.2 | 444.5 | 0.59 |

Example 8

Figure 8:
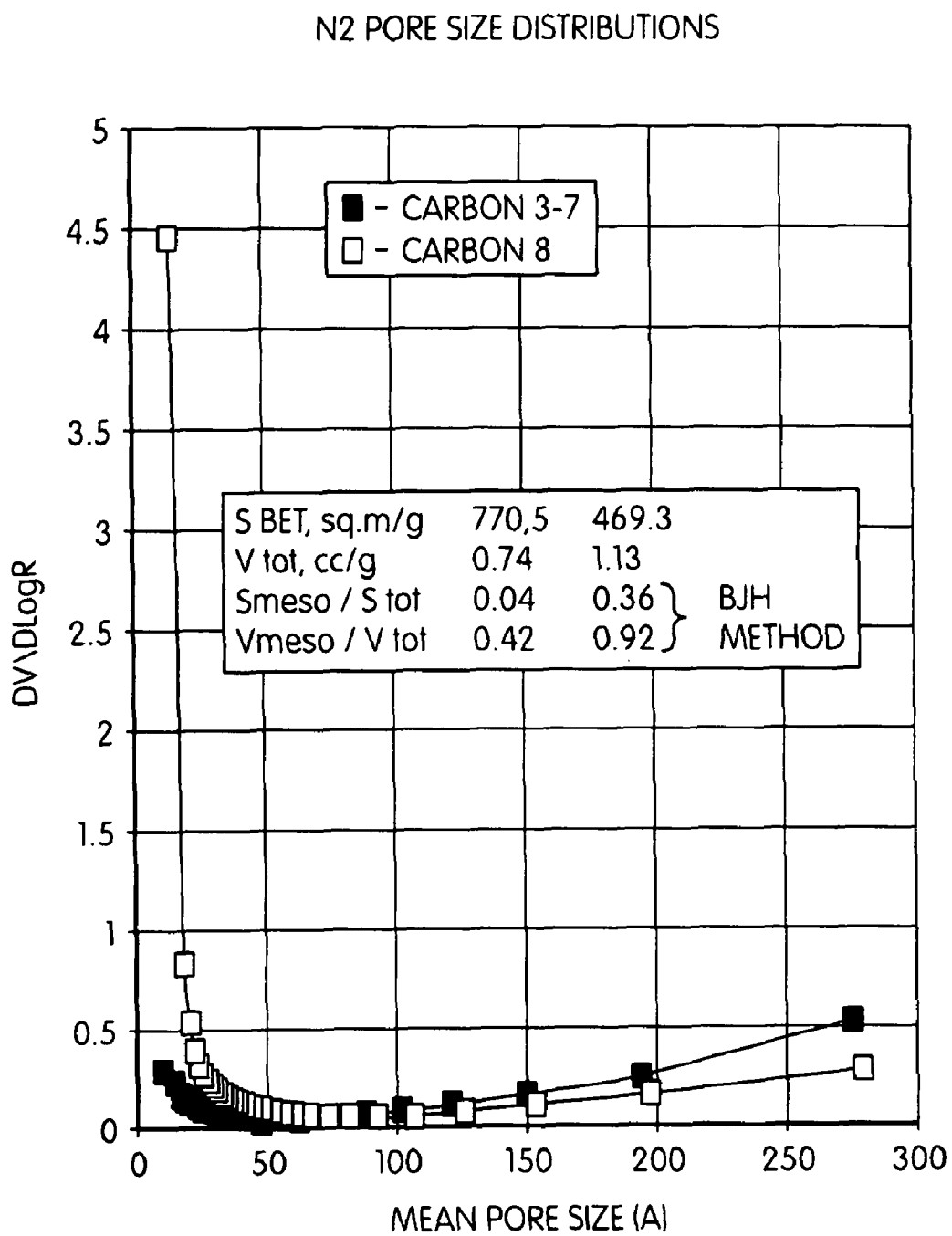
FIG. 8 shows the effect of resin cross-linking conditions on the porosity of derived carbons.

Industrial Novolac resin in amount of 100 weight parts was mixed together with 327 g of ethylene glycol at elevated temperature and on stirring to enhance the formation of clear solution, which then was cooled down to 65° C. where hexamine in amount of 9 weight parts was added. Resulting stirred mixture was briefly heated up to 70° C. just to ensure dissolution of hexamine and poured in stream into 3 volumes of stirred preheated (190° C.) mineral oil containing 0.5% of the drying oil. The temperature of resulting emulsion dropped to 160° C., and almost immediately (less than in 1 min) cross-linking occurred. The temperature of the reaction mixture was raised up to 175° C. in 15 min to complete the curing. After cooling down the resin in beads was filtered off from the oil and further processed in a way similar to Example 3. The pore size distribution graph and some structural parameters of the carbon produced from the resulting resin, cross-linked under severe conditions, (Carbon 8, 800° C., carbon dioxide) are compared on FIG. 8 with corresponding properties of the carbon (Carbon 3-7) derived from the compositionally similar resin, but cross-linked under mild conditions (Example 3, 7).

Example 9

Figure 9:
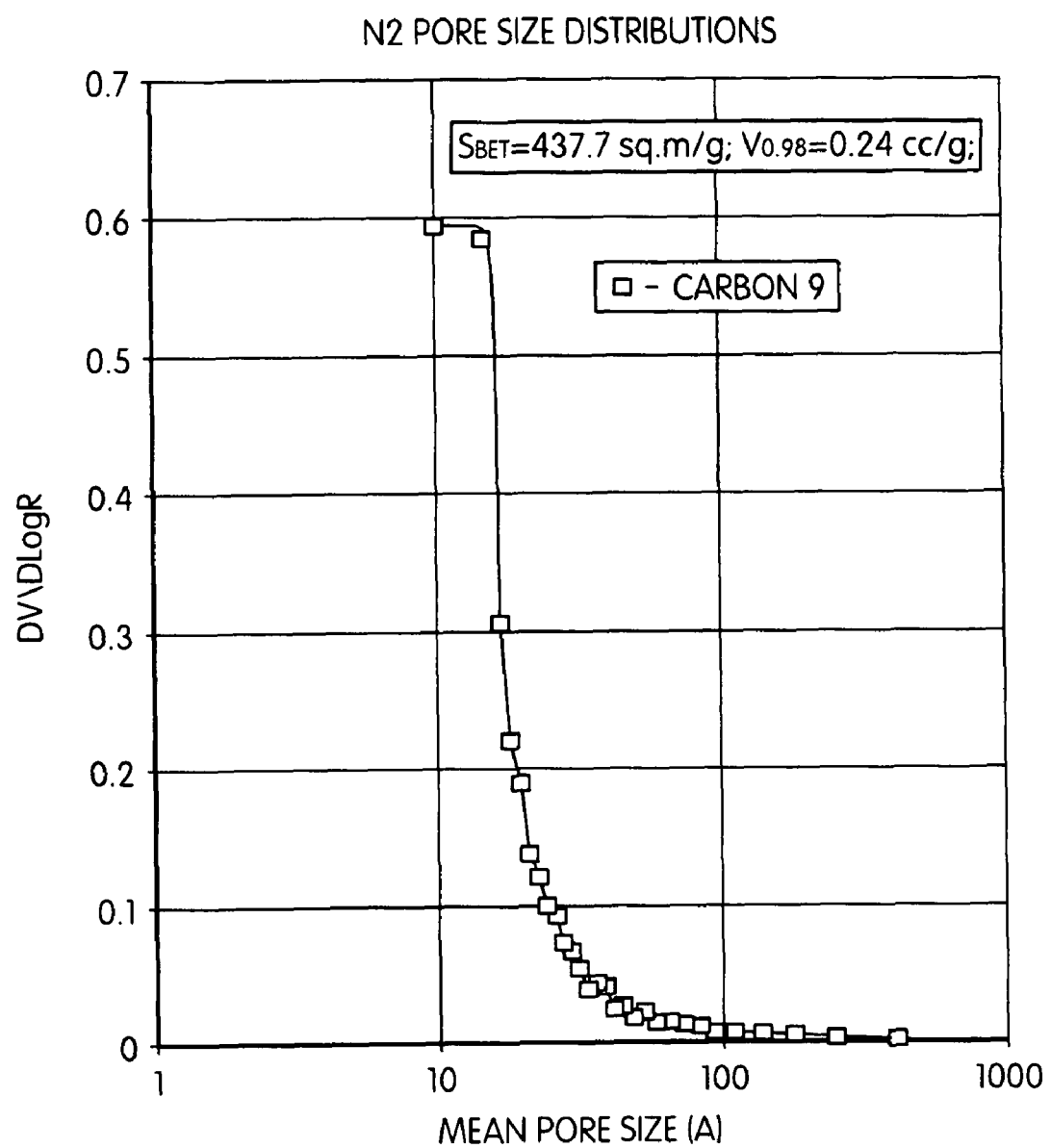
FIG. 9 shows porosity of carbon derived from the resin of Novolac-Hexamine-Furfural-Ethylene Glycol reaction system.

Industrial Novolac resin in amount of 100 weight parts was mixed together with 236 weight parts of ethylene glycol at elevated temperature and on stirring to enhance the formation of clear solution, which then was cooled down to 65° C., where hexamine in amount of 3 weight parts and furfural in amount of 15 weight parts were added. Resulting stirred mixture was gradually heated to reach 110° C. in 1 hr, and viscous solution was poured in stream into 3 volumes of stirred preheated (120° C.) oil, containing 0.5% of the drying oil. On further heating curing occurred at 140-145° C. (in 15-20 min.). After further heating to complete curing (up to 155° C. in 20 min.) and cooling resin in beads was filtered off and processed as described in Examples 3-6. Porosity parameters of corresponding carbon are presented in FIG. 9.

Example 10

Figure 10:
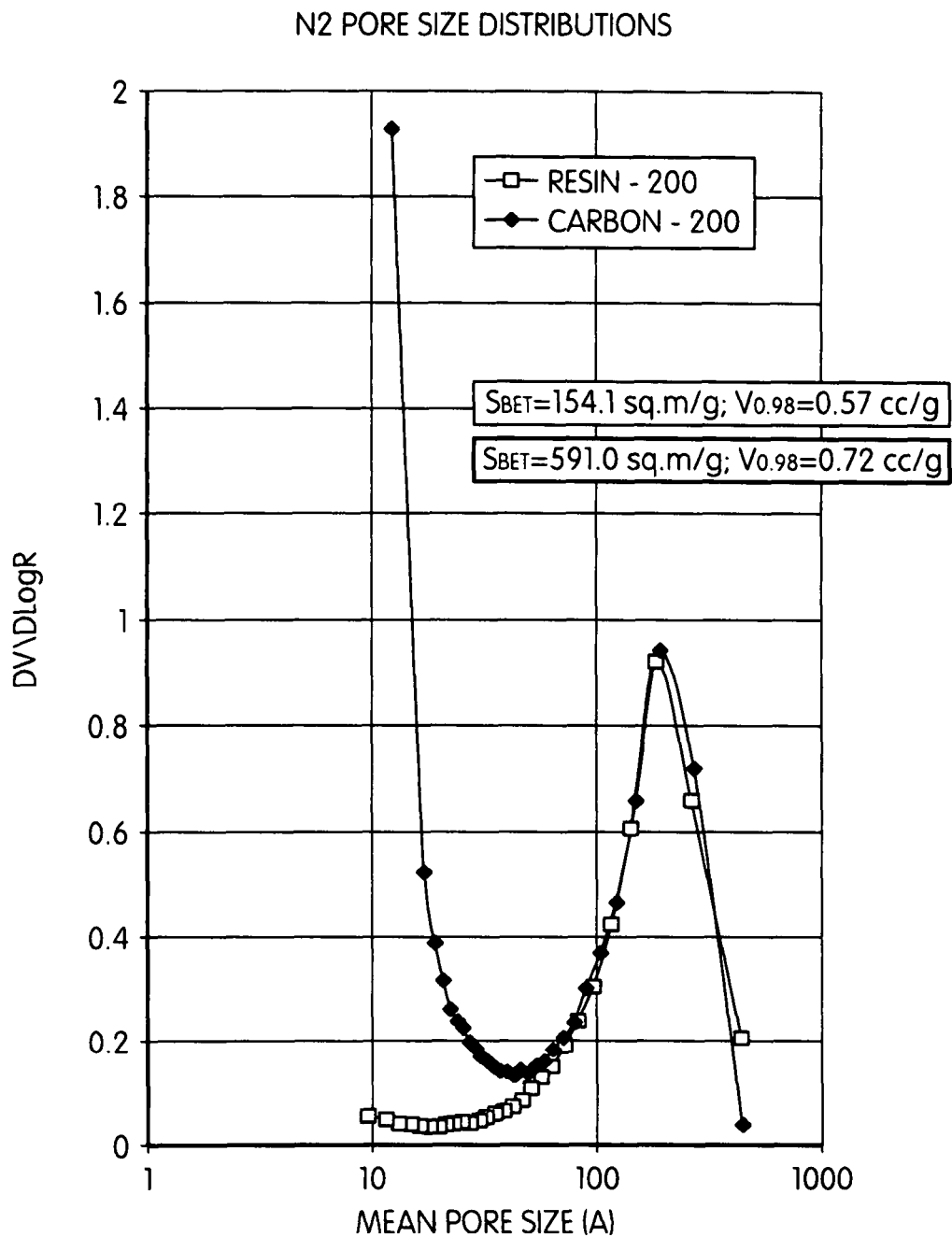
FIG. 10 shows porosity parameters of the resin prepared in block (Novolac-Hexamine-Ethylene Glycol reaction system) and derived carbon.

Industrial Novolac resin in amount of 100 weight parts was mixed together with 218 weight parts of ethylene glycol at elevated temperature and on stirring to enhance the formation of clear solution, which then was cooled down to 65-70° C., where hexamine (HA) in amount of 9 weight parts was added. Resulting stirred mixture was gradually heated at such a rate as to reach 95-97° C. in 70 min. Then the hot viscous solution was poured into shallow trays either made of or lined with inert material (e.g., Pyrex™ glass or metal lined with PTFE film) that were consequently sealed to minimise the pore former loss. Trays were put into suitable preheated (100° C.) oven. The temperature within the oven was gradually raised to reach 150° C. in an hour and maintained at this level for another hour. After cooling resulting solid blocks of resin were crashed to give particles with maximal size of 1 cm. Crushed resin was washed several times with hot water and dried at 80-100° C. on air. Dry resin could be milled, classified and carbonised in a normal way to produce mesoporous carbon of desired particle size but irregular shape of particles. If the resin is carbonised directly after crashing without washing, the mesoporosity of resulting carbon decreases essentially. The pore size distribution graphs and some structural parameters of both resin and carbonised material (800° C., carbon dioxide flow) are presented in FIG. 10. Similar procedures could be applied for the preparation in blocks of all the other resins of the invention.

Example 11

Reaction solution consisting of 100 weight parts of industrial Novolac resin, 9 weight parts of hexamine, 20 weight parts of boric acid and 258 weight parts of ethylene glycol was heated up from 70 to 100° C. in 45 min. Resulting viscous solution was poured in stream into 3 volumes of stirred preheated (105° C.) oil, containing 0.5% of the drying oil. On further heating curing occurred at around 110° C. Further heating was applied up to 160° C. in 30 min. to complete the curing. After filtering the resin beads off further treatment prior to carbonisation was applied in three different ways:

1.—No treatment at all.

2.—Several washings with hot water.

3.—Extraction with ether in Soxhlett apparatus.

Figure 11:
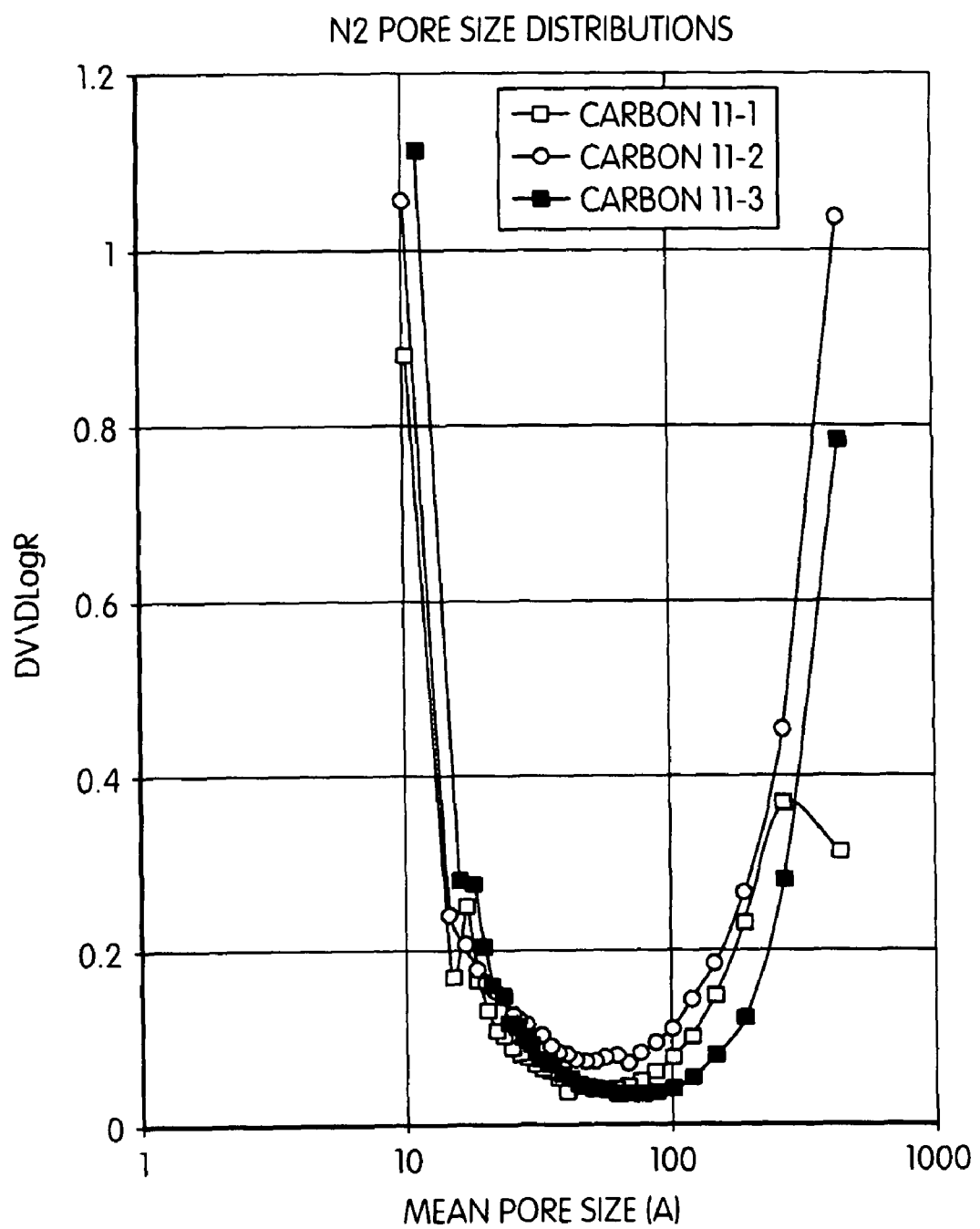
FIG. 11 shows the effect of different processing of the resin of Novolac-Hexamine-Ethylene Glycol-Boric Acid reaction system on the porosity of derived carbons.

Pore size distribution graphs of the resulting carbons 11.1 to 11.3 and other parameters are compared in FIG. 11 and Table 11.

TABLE 11

| | BET area, $m^2/g$ | Pore volume $(P/P_o = 0.98)$, $cm^3/g$ | $B_2O_3$ content, % | Bulk Density, $g/cm^3$ |
|---|---|---|---|---|
| Carbon 11.1 | 303.1 | 0.41 | 6.8 | 0.47 |
| Carbon 11.2 | 410.0 | 0.79 | 5.3 | 0.36 |
| Carbon 11.3 | 346.3 | 0.57 | 6.6 | 0.38 |

Example 12

Figure 12A:
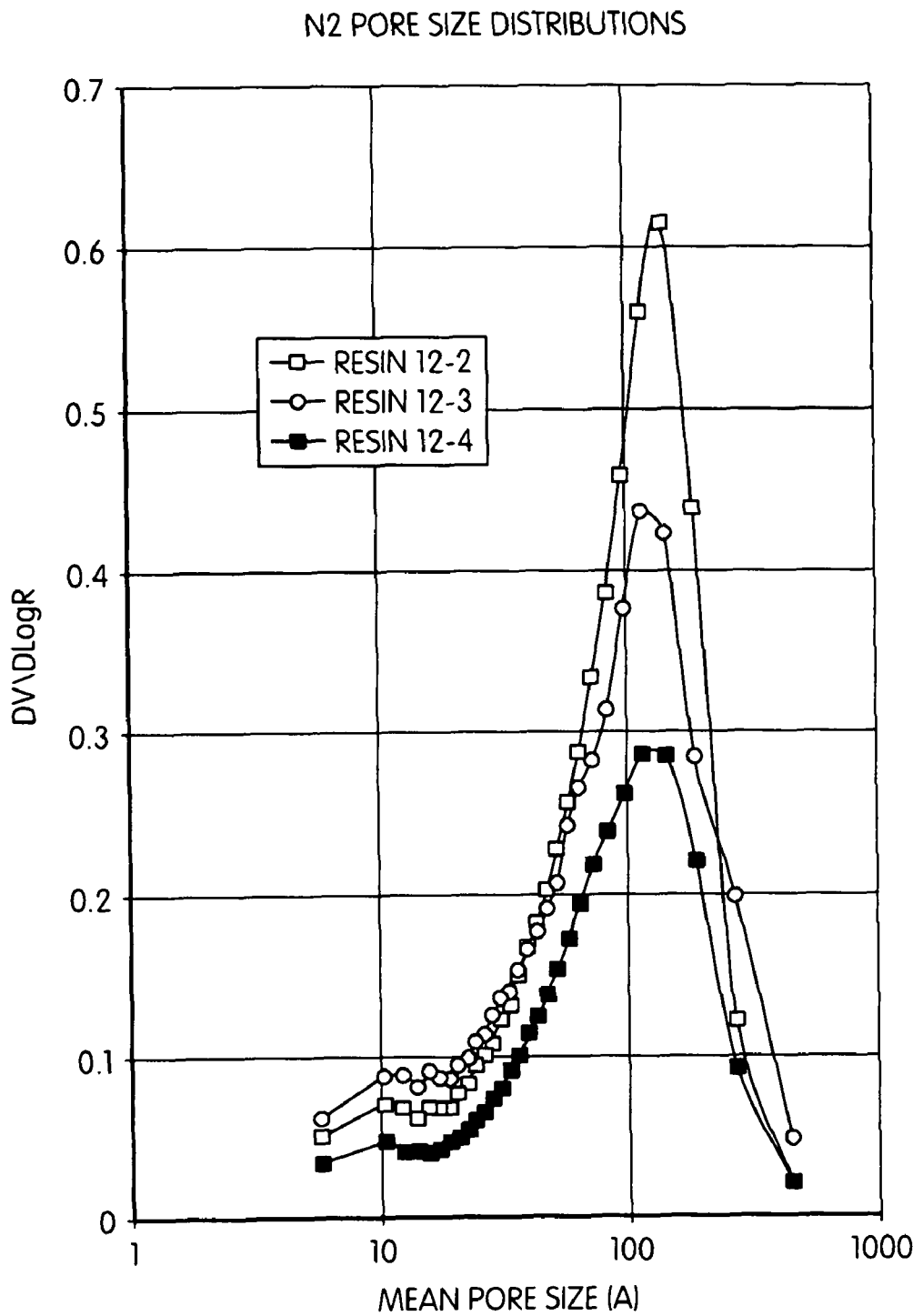
FIG. 12a shows the effect of Ethylene Glycol content in block resin composition on the porosity of the resin, reaction system Novolac-Melamine-Formaldehyde-Ethylene Glycol.
Figure 12B:
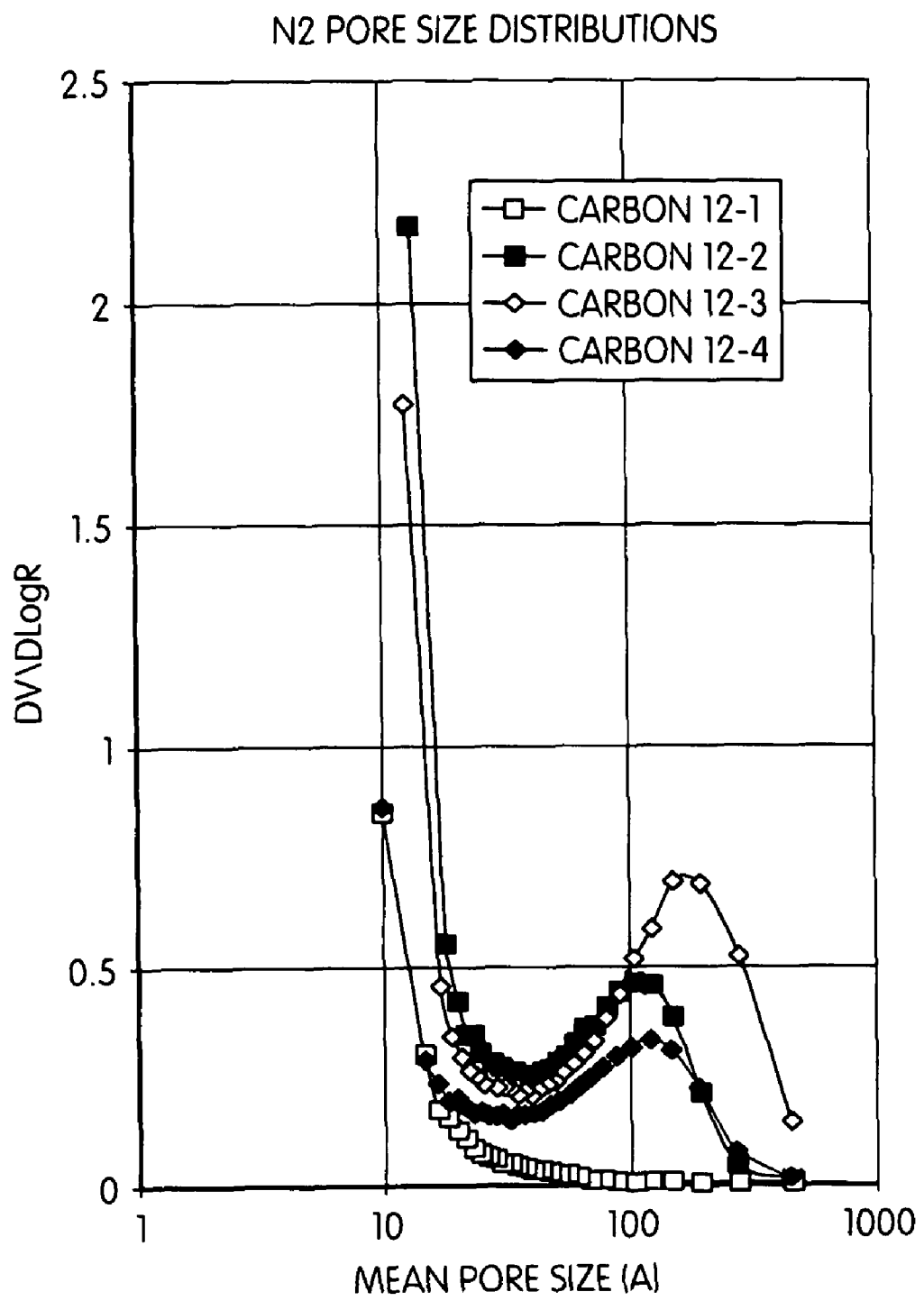
FIG. 12b shows the effect of the EG content in the composition of the resins prepared in blocks and of the reaction system Novolac-Melamine-Formaldehyde-Ethylene Glycol on the porosity of derived carbons.

A solution containing 100 weight parts of industrial Novolac resin (N), 194.4 weight parts of clear solution made of 27.54 weight parts of Melamine (M), 26.18 weight parts of Paraformaldehyde (PF) and 140.68 weight parts of Ethylene Glycol (EG), and additionally-specified amount of Ethylene Glycol (EG) (Table 12-1) was placed into glass tray, sealed, put into preheated oven and kept at 140±5° C. for 15 hours, though gelatin occurs within first 2-3 hours. After cooling down the resin in block was further processed as in Example 10. The pore size distribution graphs and some structural parameters of both resins and carbonized materials (800° C., carbon dioxide flow) are presented in FIG. 12a, 12b and Table 12-2.

TABLE 12-1

| # | Additional EG, weight parts | $\Sigma$ EG/(N + M + PF) | Gelation time, hrs |
|---|---|---|---|
| 1 | 89.85 | 1.5 | 2.00 |
| 2 | 243.55 | 2.5 | 2.50 |
| 3 | 320.40 | 3.0 | 2.75 |
| 4 | 474.10 | 4.0 | 3.00 |

TABLE 12-2

| | BET area, $m^2/g$ | Pore Volume $(P/Po = 0.98)$, $cm^3/g$ |
|---|---|---|
| Resin 12.1 | Non-porous | Non-porous |
| Resin 12.2 | 193.9 | 0.41 |
| Resin 12.3 | 202.4 | 0.38 |
| Resin 12.4 | 120.9 | 0.24 |
| Carbon 12.1 | 436.2 | 0.24 |
| Carbon 12.2 | 608.8 | 0.53 |
| Carbon 12.3 | 612.8 | 0.77 |
| Carbon 12.4 | 577.4 | 0.49 |

Example 13

Figure 13:
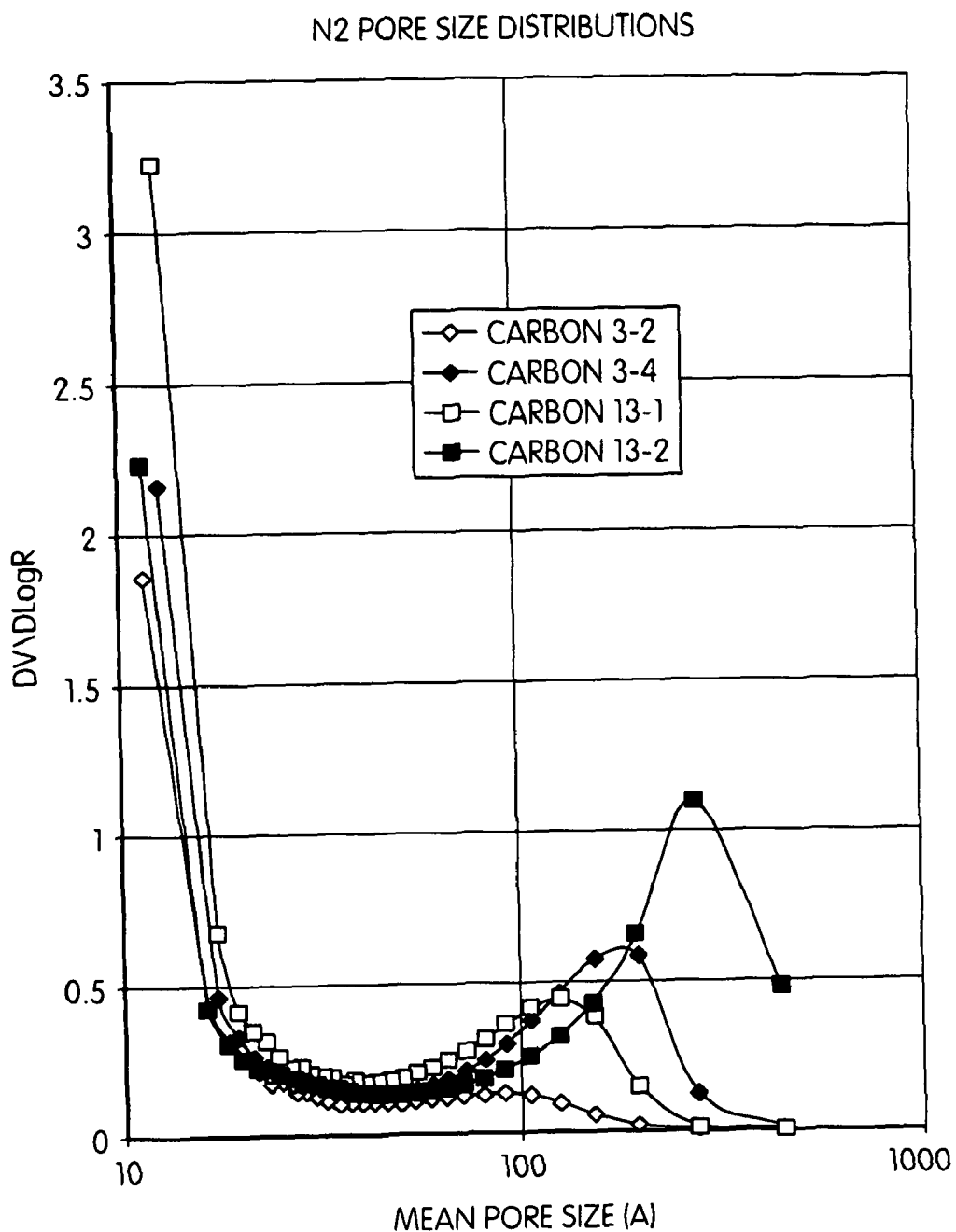
FIG. 13 shows a comparison of porosity of carbons derived from the reaction systems Novolac-Hexamine-Ethylene Glycol, Novolac-Resorcinol-Hexamine-Ethylene Glycol and Novolac-Hydroquinone-Hexamine-Ethylglycol.

Industrial Novolac resin (N) in amount of 100 weight parts was dissolved in specified amount of Ethylene Glycol (EG). The solution of 10 weight parts of Resorcinol (R) or Hydroquinone (Hq) in 30 weight parts of EG was added to the Novolac solution together with 12 weight parts of Hexamine (HA). Resulting reaction solution was heated up to a specified temperature for a specified time (Table 13-1), poured into a stirred hot oil (120° C.) containing 0.5% of the drying oil and processed further as described in Examples 3-6. Properties of the carbons derived from the resins thus obtained are compared with the properties of carbons 3.2 and 3.4 in FIG. 13 and Table 13-2.

TABLE 13-1

| # | EG, weight parts | R, weight parts | Hq, weight parts | $\frac{\Sigma EG}{N + HA + R(Hq)}$ | $\frac{\text{Ultimate solution temp., °C.}}{\text{Residence time, min.}}$ |
|---|---|---|---|---|---|
| 1 | 122.5 | 10 | — | 1.25 | 90/40 |
| 2 | 183.5 | — | 10 | 1.75 | 103/60 |

TABLE 13-2

| | BET area, m²/g | Pore Volume (P/Po = 0.98), cm³/g |
|---|---|---|
| Carbon 3.2 | 468.3 | 0.30 |
| Carbon 3.4 | 567.3 | 0.54 |
| Carbon 13.1 | 754.9 | 0.57 |
| Carbon 13.2 | 676.1 | 0.94 |

The invention claimed is:

1. A method of making mesoporous carbon, the method comprising:
   (a) providing a nucleophilic component which comprises a phenolic compound or a phenol condensation prepolymer optionally with one or more modifying reagents selected from hydroquinone, resorcinol, urea, aromatic amines and heteroaromatic amines;
   (b) dissolving the nucleophilic component in a pore former selected from the group consisting of a diol, a diol ether, a cyclic ester, a substituted cyclic ester, a substituted linear amide, a substituted cyclic amide, an amino alcohol and a mixture of any of the above with water, together with at least one electrophilic cross-linking agent selected from the group consisting of formaldehyde, paraformaldehyde, furfural and hexamethylene tetramine;
   (c) condensing the nucleophilic component and the electrophilic cross-linking agent in the presence of the pore former to form a porous resin;
   (d) comminuting the porous resin; and
   (e) carbonising the comminuted porous resin to form mesoporous carbon by treatment in an inert atmosphere at 600° C. to 800° C. with a heating rate up to 10° C. per minute of treatment time.

2. The method of claim 1, wherein the nucleophilic component is a phenol-formaldehyde novolac.

3. The method of claim 1, wherein the modifying reagent is aniline, melamine or hydroxymethylated melamine.

4. The method of claim 1, further comprising incorporating dispersed heteroatoms into the porous resin.

5. The method of claim 4, comprising incorporating metal heteroatoms into the resin by dissolving a metal salt in the pore former.

6. The method of claim 4, comprising incorporating nonmetal heteroatoms into the resin by adding an organic precursor containing the heteroatoms to the pore former.

7. The method of claim 1, wherein the pore former is ethylene glycol.

8. The method of claim 1, wherein the pore former is selected from the group consisting of 1,4-butylene glycol, diethylene glycol, triethylene glycol, γ-butyrolactone, propylene carbonate, dimethylformamide, N-methyl-2-pyrrolidone and monoethanolamine.

9. The method of claim 1, wherein at least 120 parts by weight of the pore former are used to dissolve 100 parts by weight of the nucleophilic component.

10. The method of claim 1, wherein there is dissolved in the pore former as electrophilic cross linking agent hexamethylene tetramine at a concentration of at least 9 parts by weight per 100 parts by weight of the nucleophilic component.

11. The method of claim 1, wherein the nucleophilic component which is a phenol-formaldehyde novolac and the electrophilic cross-linking agent which is hexamine are dissolved in the pore former which is ethylene glycol by smoothly increasing the temperature to 100-105° C. and the temperature is gradually raised to 150-160° C. to complete cross-linking of the resin.

12. The method of claim 1, wherein the particle size of the porous resin formed in step (e) is between 1 and 1000 μm.

13. The method of claim 1, wherein the pore former is removed from the porous resin by washing said resin with water.

14. The method of claim 11, wherein the pore former is removed from the porous resin by vacuum distillation at a temperature below 100° C.

15. The method of claim 1, wherein the porous resin is carbonized in an atmosphere selected from the group consisting of carbon dioxide, nitrogen and argon.

16. The method of claim 1, further comprising activating the porous carbon by heating it at high temperature in the presence of carbon dioxide, steam or a mixture thereof.

17. The method of claim 1, further comprising activating the porous carbon by heating it in carbon dioxide at above 800° C.

18. The method of claim 1, further comprising activating the porous carbon by heating it in air at above 400° C.

19. The method of claim 1, in which the mesoporous carbon contains macropores, mesopores of pore size between 2 and 50 nm and micropores with a mean pore size less than 2 nm.

* * * * *